United States Patent
Atkins et al.

(10) Patent No.: US 10,529,220 B2
(45) Date of Patent: Jan. 7, 2020

(54) METHOD AND SYSTEM FOR ENVIRONMENTAL MONITORING OF A PREMISES

(71) Applicant: OPILIO LABS INC., Richmond Hill (CA)

(72) Inventors: Elliott Avrom Atkins, Richmond Hill (CA); Nicholas Karl Romanidis, Richmond Hill (CA)

(73) Assignee: Opilio Labs Inc., Richmond Hill (CA)

(*) Notice: Subject to any disclaimer, the term of this patent is extended or adjusted under 35 U.S.C. 154(b) by 0 days.

(21) Appl. No.: 15/938,707

(22) Filed: Mar. 28, 2018

(65) Prior Publication Data

US 2019/0304290 A1 Oct. 3, 2019

(51) Int. Cl.
| | |
|---|---|
| *G08B 25/01* | (2006.01) |
| *G08B 25/10* | (2006.01) |
| *H04W 4/38* | (2018.01) |
| *H04W 4/14* | (2009.01) |
| *H04W 4/70* | (2018.01) |
| *H04W 4/80* | (2018.01) |
| *H04W 4/33* | (2018.01) |

(52) U.S. Cl.
CPC .......... *G08B 25/016* (2013.01); *G08B 25/10* (2013.01); *H04W 4/14* (2013.01); *H04W 4/33* (2018.02); *H04W 4/38* (2018.02); *H04W 4/70* (2018.02); *H04W 4/80* (2018.02)

(58) Field of Classification Search
CPC ......... G08B 25/016; G08B 25/10; G01S 1/00; H04W 4/38; H04W 4/33; H04W 4/70; H04W 4/80; H04W 4/14; H04W 4/00
See application file for complete search history.

(56) References Cited

U.S. PATENT DOCUMENTS

| | | | |
|---|---|---|---|
| 2013/0249736 A1* | 9/2013 | Nikitin | G01S 5/02 342/450 |
| 2014/0129307 A1* | 5/2014 | Walker | G06Q 30/0222 705/14.16 |
| 2016/0197772 A1* | 7/2016 | Britt | H04W 4/70 370/254 |
| 2018/0331914 A1* | 11/2018 | Yoshida | H04B 7/04 |

* cited by examiner

*Primary Examiner* — Shirley Lu
(74) *Attorney, Agent, or Firm* — Ridout & Maybee LLP

(57) ABSTRACT

Systems and methods for environmental monitoring of a premises. The system includes at least one sensor unit including at least one environmental sensor module for detecting at least one of the environmental variables of the premises. The system includes a base unit located on the premises, which is configured to: detect at least one of the sensor units as being in proximity of the base unit using a short range communication protocol, obtains an identifier of at least one of the sensor units, from that sensor unit, using the short range communication protocol, register, in memory of the base unit, at least one of the sensor units using the identifier of that sensor unit obtained by the base unit from the short range communication protocol, and receive, from at least one of the sensor units, data related to at least one of the environmental variables detected by that sensor unit.

19 Claims, 14 Drawing Sheets

METHOD AND SYSTEM FOR ENVIRONMENTAL MONITORING OF A PREMISES

TECHNICAL FIELD

Example embodiments generally relates to monitoring and notification of environmental conditions at a premises.

BACKGROUND

Existing systems for monitoring a premises may contain preprogramed sensors. A user's needs may change over time and it may be difficult for the user to reconfigure the sensors of such systems to meet their particular needs.

Some monitoring systems rely solely on Wireless Fidelity (Wi-Fi) networks in order to communicate sensed information. However, environmental changes and alarm conditions at the premises can be a result of a power outage, which can also result in loss of Wi-Fi network operation.

Additional difficulties with existing systems may be appreciated in view of the Detailed Description of Example Embodiments, herein below.

SUMMARY

Example embodiments generally relate to methods and system for environmental monitoring of a premises. A sensor unit may be conveniently added to the system or registered with a base unit by placing the sensor unit in a close proximity of base unit or tapping on the base unit. As well, sensor units may be easily configured, reconfigured, added or removed by a user via a user interface on a user equipment to meet the evolving needs of monitoring of the premises. The sensor units are positioned at multiple locations at a premises. The base unit itself is also located on premises and is configured for detecting one or more environmental variables.

As an alert condition at a premises can also mean a power outage that results in loss of Wireless Fidelity (Wi-Fi) network operation, some example embodiments include one or more wireless communication modalities that do not require Wi-Fi, and bypass any Wi-Fi Network.

An example embodiment is a method of monitoring one or more environmental variables of a premises. The method includes detecting, from a base unit, at least one sensor unit as being in proximity of the base unit using a short range communication protocol, each at least one sensor unit including at least one environmental sensor module for detecting at least one of the environmental variables; obtaining an identifier of at least one of the sensor units, from that sensor unit, using the short range communication protocol; registering, in memory of the base unit, at least one of the sensor units using the identifier of that sensor unit obtained by the base unit from the short range communication protocol; and receiving, by the base unit from at least one of the sensor units, data related to at least one of the environmental variables detected by that sensor unit.

According to any one of the preceding example embodiments, the identifier is a radiofrequency identity (RF ID) of the at least one sensor, and wherein the base unit has an RF ID reader for reading the identifier.

According to any one of the preceding example embodiments, the at least one sensor unit is detected the base unit by tapping on the base unit, and the method further comprises, in response to the tapping, receiving in the RF ID reader of the base unit the RF ID from the sensor unit.

According to any one of the preceding example embodiments, the method further comprises the base unit registering with a server by transmitting to the server a base unit identifier that is uniquely associated with the base unit, and further comprises the base unit registering with the server at least one of the sensor units that are registered with the base unit by transmitting to the server the identifier of that sensor unit.

According to any one of the preceding example embodiments, the method further comprises transmitting, by the base unit to the server, data related to at least one of the environmental variables detected by at least one of the sensor units.

According to any one of the preceding example embodiments, the method further comprises processing, at the server or at the base unit, data related to at least one of the environmental variables detected by at least one of the sensor units, determining an alert event from said processing, and in response to said determining, sending a notification from the server to a user equipment.

According to any one of the preceding example embodiments, the notification is sent to the user equipment by a text message, an email, or a push notification.

According to any one of the preceding example embodiments, the server communicates with the base unit by one or more text messages via short message service (SMS).

According to any one of the preceding example embodiments, the method further comprises the server sending, to a user equipment, data relating to at least one of the environmental variables detected by at least one of the sensor units.

According to any one of the preceding example embodiments, the transmitting from the base unit to the server is performed over the Wireless Wide Area Network (WWAN) and bypasses any Wireless Fidelity (Wi-Fi) network.

According to any one of the preceding example embodiments, the method further comprises, in response to the detecting of at least one of the sensor units as being in the proximity of the base unit, generating, at the base unit, a visual output and/or an audio output.

According to any one of the preceding example embodiments, the method further comprises approving the registering of at least one of the sensor units via a user interface displayed on a user equipment, wherein the user interface displays the identifier of that sensor unit.

According to any one of the preceding example embodiments, at least one of the environment variables detected by at least one of the sensor units includes temperature, humidity, and/or liquid of the premises.

According to any one of the preceding example embodiments, the short range communication protocol is a RF ID protocol or a near field communication (NFC) protocol.

According to any one of the preceding example embodiments, the base unit comprises at least one environmental sensor module for detecting at least one of the environmental variables.

According to any one of the preceding example embodiments, the at least one of the environmental sensor modules of the base unit is configured to detect temperature, water, and/or outlet power of the premises.

According to any one of the preceding example embodiments, at least one of the environmental variables detected by the base unit is not detected by any of the sensor units.

According to any one of the preceding example embodiments, at least one of the environmental variables detected by any of the sensor units is not detected by the base unit.

According to any one of the preceding example embodiments, a same one of the environmental variables is detected by both the base unit and at least one of the sensor units.

According to any one of the preceding example embodiments, the method further comprises sending, by the base unit to a server, data related to at least one environmental variables detected by the base unit and data related to at least one of the environmental variables detected by at least one of the sensor units.

According to any one of the preceding example embodiments, the method further comprises: detecting, by the base unit, a power outage through detection of outlet power; and in response: activating, by the base unit, a battery backup unit for supplying power to the base unit.

According to any one of the preceding example embodiments, said receiving by the base unit of the data from at least one of the sensor units relating to at least one of the environmental variables is received via a wireless communication channel using an unlicensed frequency spectrum.

According to any one of the preceding example embodiments, said receiving by the base unit of the data from at least one of the sensor units relating to at least one of the environmental variables is received via a wireless communication modality that bypasses the short range communication protocol and bypasses any Wi-Fi network.

According to any one of the preceding example embodiments, said detecting is performed for at least one of the sensor units when that sensor unit is tapped to the base unit.

Another example embodiment is a system for monitoring one or more environmental variables of a premises. The system includes at least one sensor unit including at least one environmental sensor module for detecting at least one of the environmental variables; and a base unit configured to: detect at least one of the sensor units as being in proximity of the base unit using a short range communication protocol, obtains an identifier of at least one of the sensor units, from that sensor unit, using the short range communication protocol, register, in memory of the base unit, at least one of the sensor units using the identifier of that sensor unit obtained by the base unit from the short range communication protocol, and receive, from at least one of the sensor units, data related to at least one of the environmental variables detected by that sensor unit.

According to any one of the preceding example embodiments, the system further comprises a server, wherein the base unit is configured to register the base unit with the server by transmitting to the server a base unit identifier that is uniquely associated with the base unit, and to register at least one of the sensor units with the server in association with the base unit, by the identifier of that sensor unit.

According to any one of the preceding example embodiments, the system further comprises a user equipment for receiving a notification from the server and for approving the registering of at least one of the sensor units with the base unit.

According to any one of the preceding example embodiments, the base unit is further configured to transmit, to the server, data related to at least one of the environmental variables detected by at least one of the sensor units.

According to any one of the preceding example embodiments, the base unit comprises at least one environmental sensor module for detecting at least one of the environmental variables.

According to any one of the preceding example embodiments, the base unit further includes a power detector, the power detector configured to detect power outage through a power outlet.

According to any one of the preceding example embodiments, the base unit further includes a battery backup unit for supplying power to the base unit upon detecting of the power outage.

Another example embodiment is a system for monitoring one or more environmental variables of a premises. The system includes at least one sensor unit including at least one environmental sensor module for detecting at least one of the environmental variables; a base unit including at least one environmental sensor module for detecting at least one of the environmental variables, the base unit configured to: detect at least one of the sensor units as being in proximity of the base unit, register at least one of the sensor units, in response to at least said detecting, in memory of the base unit, receive, from at least one of the sensor units, data related to at least one of the environmental variables detected by that sensor unit, and transmit data related to at least one of the environmental variables detected by at least one of the sensor units and data related to at least one of the environmental variables detected by the base unit.

According to any one of the preceding example embodiments, the base unit is further configured to detect outlet power; wherein the at least one environmental sensor module of the base unit is configured for detection of temperature and humidity; and wherein the at least one environmental sensor module of each sensor unit is configured for detection of temperature, humidity and liquid.

According to any one of the preceding example embodiments, said detecting of at least one of the sensor units is detected by the base unit by using a short range communication protocol.

According to any one of the preceding example embodiments, said detecting of at least one of the sensor units is performed when that sensor unit is tapped to the base unit.

According to any one of the preceding example embodiments, the system further comprises a server, wherein the base unit is configured to register the base unit with the server by transmitting to the server a base unit identifier that is uniquely associated with the base unit, and to register at least one of the sensor units with the server that are registered with the base unit, by the identifier of that sensor unit, and wherein said transmitting of the data from the base unit is transmitted to the server

BRIEF DESCRIPTION OF THE DRAWINGS

Reference will now be made, by way of example, to the accompanying drawings which show example embodiments, and in which:

FIGS. 4A, 4B, 4C, 4D and 4E illustrates a local sensing system of the system of FIG. 1 and configuration of a sensor unit, according to an example embodiment;

FIGS. 5A, 5B and 5C illustrates configuration of a Wi-Fi network, according to an example embodiment;

FIGS. 6A, 6B and 6C illustrates a user equipment of FIG. 1 and notifications displayed thereon, according to an example embodiment.

Similar reference numerals may have been used in different figures to denote similar components.

DETAILED DESCRIPTION OF EXAMPLE EMBODIMENTS

An example embodiment is a method of monitoring one or more environmental variables of a premises. The method includes detecting, from a base unit, at least one sensor unit as being in proximity of the base unit using a short range communication protocol, each at least one sensor unit including at least one environmental sensor module for detecting at least one of the environmental variables; obtaining an identifier of at least one of the sensor units, from that sensor unit, using the short range communication protocol; registering, in memory of the base unit, at least one of the sensor units using the identifier of that sensor unit obtained by the base unit from the short range communication protocol; and receiving, by the base unit from at least one of the sensor units, data related to at least one of the environmental variables detected by that sensor unit.

Another example embodiment is a system for monitoring one or more environmental variables of a premises. The system includes at least one sensor unit including at least one environmental sensor module for detecting at least one of the environmental variables; and a base unit configured to: detect at least one of the sensor units as being in proximity of the base unit using a short range communication protocol, obtains an identifier of at least one of the sensor units, from that sensor unit, using the short range communication protocol, register, in memory of the base unit, at least one of the sensor units using the identifier of that sensor unit obtained by the base unit from the short range communication protocol, and receive, from at least one of the sensor units, data related to at least one of the environmental variables detected by that sensor unit.

Another example embodiment is a system for monitoring one or more environmental variables of a premises. The system includes at least one sensor unit including at least one environmental sensor module for detecting at least one of the environmental variables; a base unit including at least one environmental sensor module for detecting at least one of the environmental variables, the base unit configured to: detect at least one of the sensor units as being in proximity of the base unit, register at least one of the sensor units, in response to at least said detecting, in memory of the base unit, receive, from at least one of the sensor units, data related to at least one of the environmental variables detected by that sensor unit, and transmit data related to at least one of the environmental variables detected by at least one of the sensor units and data related to at least one of the environmental variables detected by the base unit.

Figure 1:
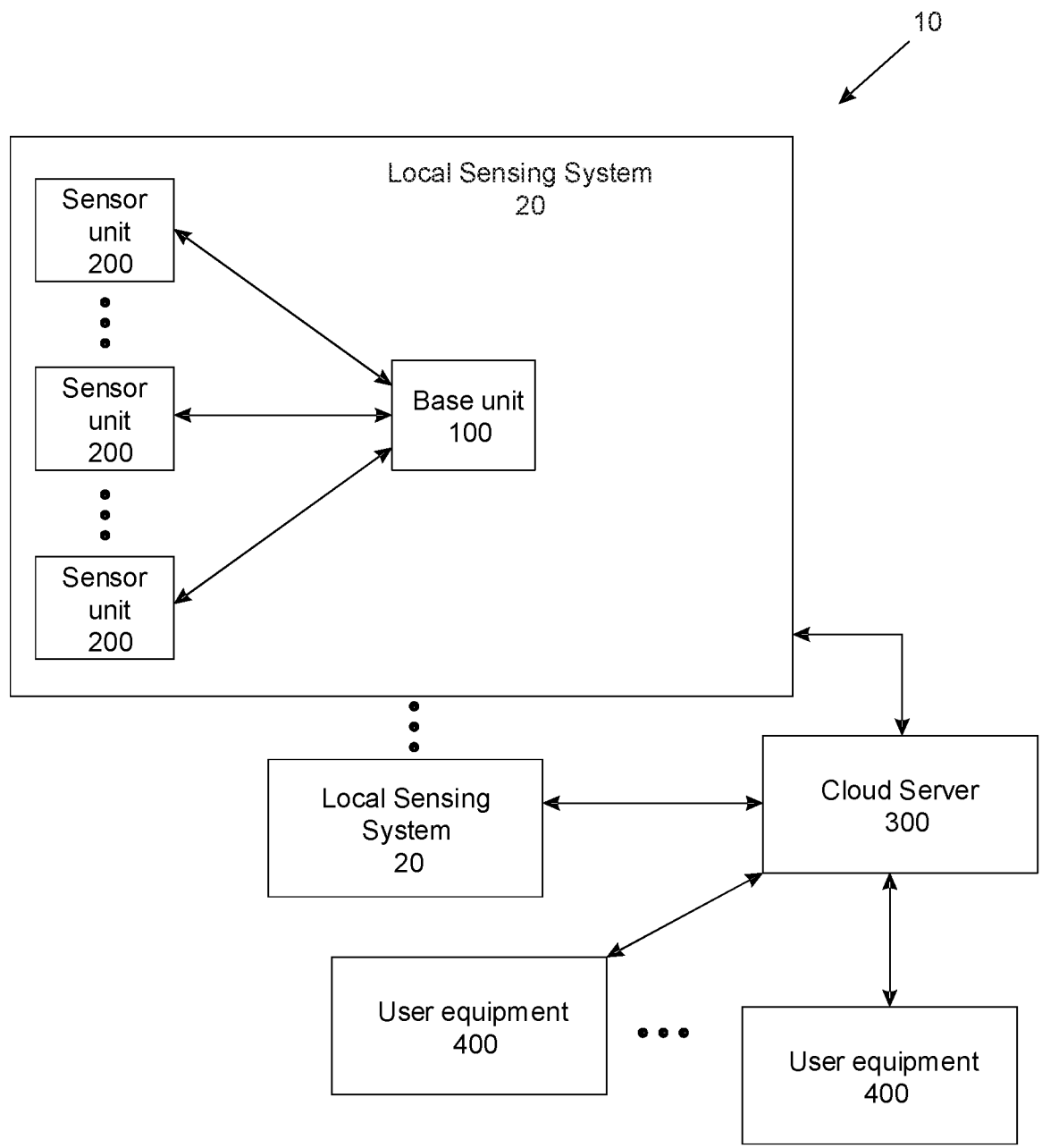
FIG. 1 is a block diagram of an environment sensing and notification system, according to an example embodiment.

FIG. 1 illustrates an environment sensing and notification system 10, in accordance with an example embodiment. The system 10 may include one or more local sensing systems 20, at least one server 300 (that can comprise at least one server and/or at least one cloud server), and one or more user equipment 400.

The local sensing system 20 may be placed in a premises, such as a dwelling, building, etc. Different local sensing systems 20 may each be placed at a different premises. The local sensing system 20 senses environmental variables of the surrounding environment of a particular premises in which the local sensing system 20 is placed. The premises can include static premises such as a dwelling or building, as well as moving premises such as aircraft, vessel, etc.

The sever 300 may be placed in a remote location from the premises. The server 300 can be a cloud-based server. The server 300 is configured to communicate with the local sensing systems 20 and the user equipment 400 according to one or more communication protocols. In some examples, the server 300 communicates with the local sensing systems 20 and the user equipment 400 in a secured manner, for example, via secured links. The server 300 may communicate with the base unit 100 of the local sensing system 20 via short message service (SMS), for example, notifying the local sensing system 20 to take certain action. The server 300 may provide a user interface, such as a web-portal or a dashboard for the user equipment 400 to connect to and control the local unit 20. The server 300 may include a memory 302 for storing data from the local sensing systems 20. The user equipment 400 may be computers, a laptops, smart phones, cell phones, or a tablets. The server 300 may also store software updates to the local sensing systems 20 and notifying the user equipment 400, for example by using a flag to indicate that a software update is available. A user equipment 400 may check the status of the software or the flag for software update in the server 300. The server 300 may also notify a user equipment 400 with the sensed results from the local sensing systems 20, for example, by emails or short messages. The user equipment 400 may download the software from the server 300 to the local sensing systems 20 via a suitable communication modality over the Internet.

Figure 4A:
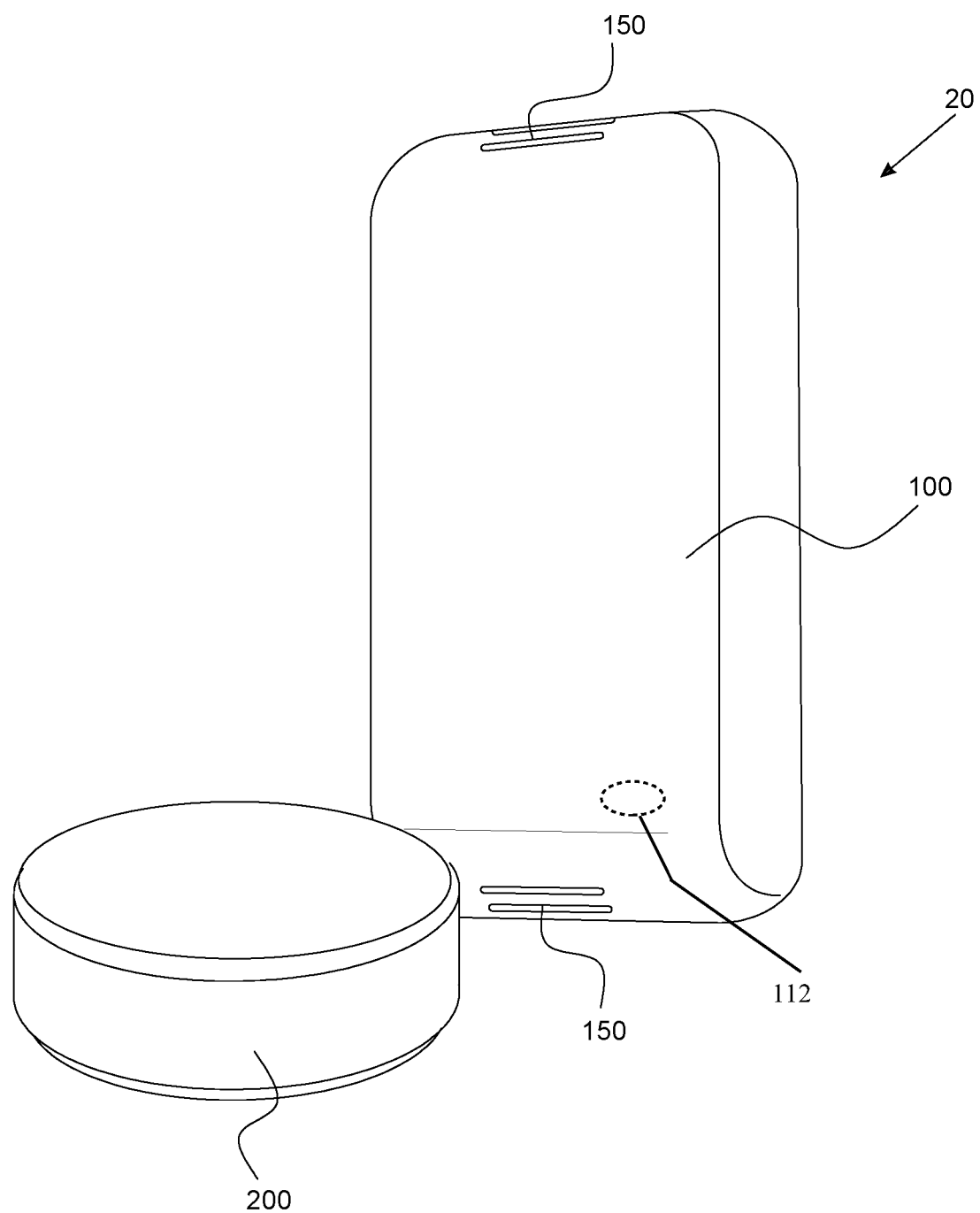

In FIG. 1, a local sensing system 20 includes the base unit 100, and one or more sensor units 200. The base unit 100, and one or more sensor units 200 are placed in suitable areas on the same premises, for detecting of one or more environmental variables of the premises. The base unit 100 is configured to communicate with the sensor units 200, for example, by sending commands to the sensor units 200 and/or by receiving the sensed data from the sensor units 200. FIG. 4A is an example of the base unit 100 and the sensor unit 200 of the local sensing system 20. The base unit 100 and the sensor unit 200 can include a rigid casing to protect the interior contents. In the example of FIG. 4A, the base unit 100 can include one or more vents 150 for allowing airflow to the internal humidity and/or temperature sensor. The sensor unit 200 may include a smoke detector, carbon monoxide detector, a sound detector, a humidity detector, and may include the one or more vents 150 for allowing airflow to the sensor unit.

In some examples, the base unit 100 may be further configured to communicate with the server 300, for example by uploading the received sensor data of the environment variables, as received from the sensor units 200, to the server 300. The base unit 100 may be further configured to itself detect one or more environmental variables, and send associated data to the server 300. The server 300 may then store the uploaded data and notify a user equipment 400, for example, by short messages (SMS), emails, or push notification. Data transmitted from the server 300 to the user equipment 400 can be ongoing monitoring data, or can be specific alert notifications in response to an alert event determined from the detected environmental variables. Example alert events include floods, leaks, power outage, temperature drops.

Each sensor unit 200 has one or more environmental sensor modules 214 (can also be referred to as "sensor unit environmental sensor module"). Each environmental sensor module 214 is each configured to sense a particular environment variable from its local environment that can be converted to analog or digital data. In some examples, the converted analog or digital data is in proportion to the particular environment variable being sensed. An example environmental sensor module is a humidity sensor. Another example environmental sensor module is a temperature sensor. Another example environmental sensor module is a liquid sensor, such as a water sensor for detecting leaks or flooding. The sensor units 200 may be wireless sensors that are configured for wireless communication. Each sensor unit 200 can be placed at different locations around the premises, and send communications related to detected environmental data to the base unit 100. The base unit 100 is also located on the same premises. In some example embodiments, at least one of the sensor units 200 can placed out of range of a short range communication protocol of the base unit 100. In some examples, one of the sensor units 200 remains in proximity to the base unit 100, for example when different environmental variables are detectable by each device.

Figure 2:
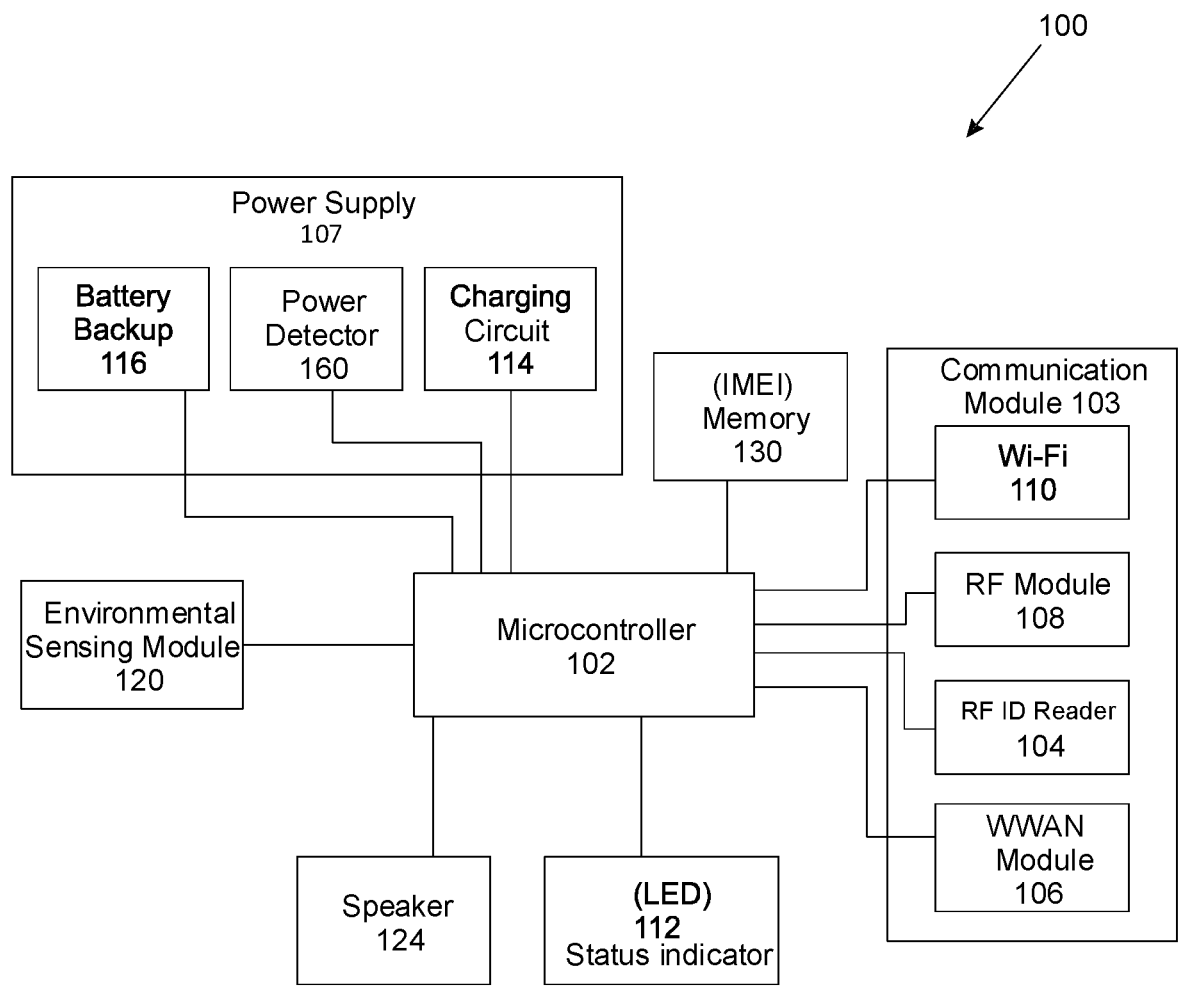
FIG. 2 is a block diagram of a base unit in FIG. 1, according to an example embodiment.
Figure 4B:
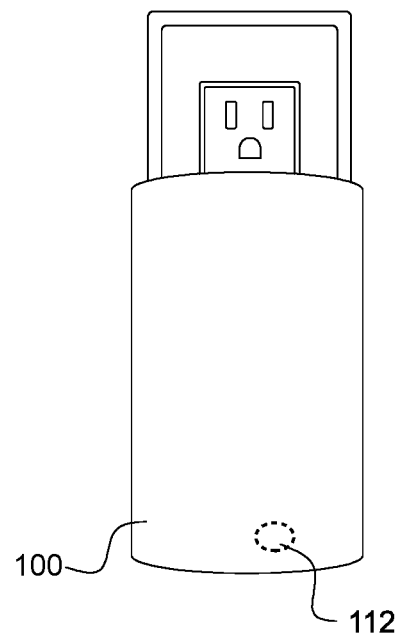

FIG. 2 illustrates an exemplary configuration of the base unit 100. In FIG. 2, the base unit 100 may include a microcontroller 102, a communications module 103, and a power supply module 107. The base unit 100 may have a plug that is plugged in a power outlet and hang on a wall, as illustrated in FIG. 4B.

The microcontroller 102 may include a processor or a central processing unit (CPU), a memory 130 such as a ROM and RAM for storing data, and input or output peripherals. The microcontroller 102 may act as a central controller for controlling all of the communications of the base unit 100 with the sensor units 200, the server 300, and the user equipment 400. The base unit 100 has a base unit identifier, such as an International Mobile Equipment Identity (IMEI) stored in the memory 130, which may be a 15 digits number, for example. Other example embodiments of the base unit identifier include a hexadecimal identifier, or a Media Access Control (MAC) address. The IMEI uniquely identifies the base unit 100 on the system 10. IMEI is included in each communication between the base unit 100 and the server 300, and between the base unit 100 and the user equipment 400, to identify the base unit 100. In some examples, the base unit 100 may communicate directly with the user equipment 400 via wireless communications, such as with the Wi-Fi and cellular radio function. In some examples, the base unit 100 may act as a hub to other smart home devices, or other sensor units, or acting as a hot-spot for sensor units 200 placed in recreation vehicles or mobile homes. In some examples, in response to a SMS received from the server 300, the microcontroller 102 may communicate with the server 300 using a RESTful API, which is a set of Hypertext Transfer Protocol (HTTP) POST and GET requests. For example, the microcontroller 102 communicates with the server 300 with the RESTful API to configure a Wi-Fi (Wireless Fidelity) network. In some examples, the microcontroller 102 may communicate with the server 300 using a web sockets, long polling sockets, or message queuing telemetry transport (MQTT).

The microcontroller 102 communicates with the sensor units 200, the server 300, and/or the user equipment 400 via the communications module 103. In some examples, the microcontroller 102 receives data from the sensor units 200, saves the data to a memory, and processes the received data. The data may be real time data or historical data. The microcontroller 102 may process the data by, for example, comparing data with the preset thresholds. The microcontroller 102 may send the results of the processed data to the user equipment 400 via the communication module 103, for example, the Wireless Wide Area Network (WWAN) module 106 or the Wi-Fi module 110.

In an example embodiment, the microcontroller 102 may be configured to upload the data received from the sensor units 200 or the processed results of the sensed data to the server 300 through the communication module 103. The microcontroller 102 may send data, including the sensed data from the sensor units 200, to the server 300 periodically, such as once every hour, to update the server 300 with, for example, the latest temperature, power and water readings, among other information. As well, the microcontroller 102 may be configured to send sensed data, detected by the base unit 100, to the server 300 periodically, such as once every hour, to update the server 300 with, for example, the latest temperature, power and water readings, among other information. Further, such sensed data, detected by the sensor units 200 and/or the base unit 100, can then be transmitted from the server 300 to the user equipment 400 (e.g. push or pull). In an example, as a default, wireless communications between the base unit 100 and the server 300 use the WWAN, and bypass (do not use or require) any Wi-Fi Network. For example, Wi-Fi networks may be prone to power outages.

In some examples, the data that is uploaded includes both the IMEI to identify the base unit 100, and the sensor ID, such as the MAC address of the sensor or the identifier of the sensor, to identify the sensor unit 200 that has generated the sensed data. The data can be contained in one or more communications. Some of the data, for example the sensor ID and the MAC address, may be contained in a header of a communication (e.g. HTTP communication), while the data relating to the sensed environmental variables can be the payload of the HTTP communication. Other example triggers for sending the data are as follows: the microcontroller 102 may also send the received data from the sensor units 200 when the power loss is detected, when a sensor unit 200 recognized by the base unit 100 detects water, or detects a change in the environment, such as temperature or humidity. The server 300 may store the received data or the processed results from the base unit 100. The server 300 may also communicate the sensed data or the processed results to the user equipment 400 according to the preference of the user, for example, via emails, SMS, push notification.

The microcontroller 102 may be further configured to control the environment of a premises. For example, based on the sensed data from the sensor units 200, the microcontroller may turn on or off another device, such as an A/C outlet to a pump, or to a water shutoff valve.

The communication module 103 can include a short range communication that is used to determine that a sensor unit 200 is placed in proximity to the base unit 100. The communication module 103 may include a radiofrequency identification (RF ID) reader 104, a WWAN module 106, an RF module 108, and/or a Wi-Fi module 110. The microcontroller 102 controls the communication module 103.

Figure 4C:
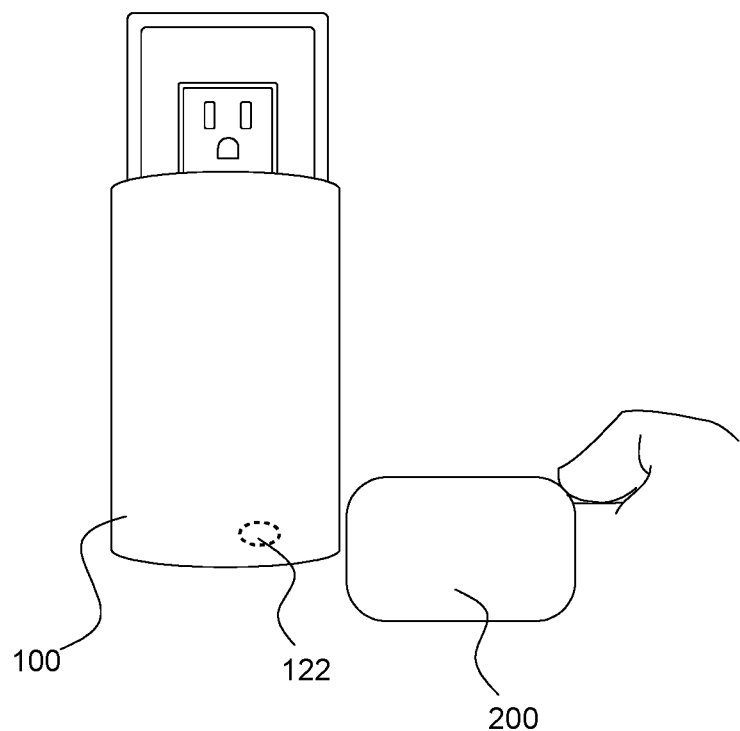

The RF ID reader 104 reads or detects the identifier uniquely associated with each of the sensor units 200 from their RF ID 201, when the sensor unit 200 is tapped to or placed in a close proximity with the base unit 100, as shown in FIG. 4C. In some examples, the RF ID reader 104 sends the identifiers read from the sensor units 200 to the microcontroller 102 for the base unit 100 to recognize the sensor unit 200 and for the base unit 100 to store the identifiers in the memory 130 of the base unit 100. The microcontroller 102 then registers the sensor units 200 with the base unit 100 based on their respective RF identifiers. In other words, with the RF identifiers, the base unit 100 recognizes respective sensor units 200. The recognizing process will be described in greater detail below. The sensor unit 200 may send its identifier (e.g. alphanumeric 9 digit code or the Media Access Control (MAC) address) to the base unit 100 via any near field communications modules, such as infrared or Bluetooth™.

The WWAN module 106 functions as a wireless communication module for the base unit 100 to access standard wireless communications services, such as communications services provided by GSM, GPRS, 3G, LTE, and 5G wireless networks. In some examples, the WWAN module 106 also includes a subscriber identity module or subscriber identification module (SIM) card, which allows the base unit 100 to use commercially available wireless communications services. In some examples, the WWAN module 106 also includes a subscriber identity module or subscriber identification module (SIM) card, which allows the base unit 100 to access commercially available wireless communications services. In some examples, a PIN code may be used to protect the SIM card. The pin code may be programmed to prevent the SIM card from being removed from the base unit 100 and used in another compatible device. Additional security measures such as a private VPN with the mobile provider may be used for access to the server 300. In order for someone to gain access to the network they will need to know the access point name and the PIN code to enhance security of the system 10. In some examples, the WWAN module 106 is a cellular radio module and able to receive and send text messages via short message service (SMS). The text messages cause interrupt of the microcontroller 102. For example, upon receiving a SMS, the WWAN module 106 may notify the microcontroller 102 that an SMS is received as saved in the memory 130. If the microcontroller 102 is not busy, the microcontroller 102 may read the SMS from the memory 130. Based on the contents of the SMS, the microcontroller 102 may perform an action, for example, clearing Wi-Fi settings or transmitting more current sensed data. The WWAN module 106 may make HTTP request over Secure Sockets Layer (SSL) and open a TCP socket over SSL so that the WWAN module 106 may access a RESTful API using TCP/IP protocol.

RF module 108 allows the base unit 100 to transmit and/or receive data in the form of wireless signals with the corresponding RF module of the sensor units 200, using for example unlicensed frequency spectrum, for example on 915 MHz band. Example embodiments that refer to the unlicensed frequency spectrum can also be applied to one unlicensed frequency channel. The RF module 108 may include power amplifying circuits for amplifying the RF signals, and frequency modulation circuits for modulating the signals to the selected radio frequency, and antennas for the RF signals to be radiated to the sensor units 200 or to receive the RF signals from the sensor units 200.

The Wi-Fi module 110 provides circuits that enable the base unit 100 to use Wi-Fi networks and to transmit data to the server 300 or sensor units 200, and to receive data from sensor units 200 or from the server 300. For example, the Wi-Fi module 110 may include a Wi-Fi tranceiver. A user may use the user equipment 400 to configure the Wi-Fi module 110 via the server 300, for example, via a cloud based web-portal. The Wi-Fi configuration process will be described in great detail below.

The Wi-Fi module 110 may scan available Wi-Fi networks, and connect the base unit 100 to a selected Wi-Fi network. The Wi-Fi module 110 may detect loss of the Wi-Fi networks and loss of the Internet connection. As well, the Wi-Fi module 110 may make HTTP request over SSL and open a TCP socket over SSL so that the Wi-Fi module 110 may access a webpage using TCP/IP protocol. In some examples, all of the communications between the base unit 100 and the sever 300 is encrypted.

In some examples, the base unit 100 may first activate the WWAN module 106 as the primary communication module when the base unit 106 is started, for example, powered on. The base unit 100 may then set up the Wi-Fi module 110. The base unit 100 may use the Wi-Fi module 110 if the signal strength or traffic rate of the Wi-Fi is better than that of the WWAN, or if the WWAN is not available, or if Wi-Fi is a desired lower cost modality as set by a user through the user equipment 400.

In the example of FIG. 2, the power supply module 107 includes a charging circuit 114, and a battery backup 116. The charging circuit 114 receives the power from an outlet of a premises, converts the received power to appropriate voltage and current, and supplies the converted power to various elements of the base unit 100. The battery backup 116 may include rechargeable battery, such as rechargeable Lithium ion battery. The charging circuit 114 may directly supply the converted power to the battery backup 116 for charging the rechargeable battery, the microcontroller 102, and communication module 103, and the status indicator 112. In another example, the charging circuit 114 supplies the converted voltage and current to the battery backup 116 for charging the rechargeable battery, and the rechargeable battery of the battery backup 116 supplies power to the base unit 100, such as the microcontroller 102, and communication module 103, and the status indicator 112. The power supply module 107 may also include a switch to turn on or off of the base unit 100.

The power supply module 107 may include a power detection circuit, such as a power detector 160, to determine when outlet power is lost. The power detector 160 can be a presence/absence power detector 160 in an example embodiment. In another example embodiment, the power detector 160 measures the specific signal from the outlet (e.g., power, voltage or current). When the input power from the outlet of the premises is lost, drops below a threshold, or is fluctuating, the battery backup 116 is configured to seamlessly supply power to the base unit 100, for example, by the rechargeable battery. Typically, the rechargeable battery is capable of supplying power the base unit for at least 24 hours. In some examples, the microcontroller 102 may report the remaining power of the battery to the server 300 and the user equipment 400. When the power is lost, the microcontroller 102 reports the power loss to the server 300 as an alert event, for example via HTTP request and/or to the user equipment 400 via emails, text messages, or push notification. As well, the base unit 100 may use only the WWAN module 106 to transmit the data received from the sensor units 200 to the server 300 in an example embodiment, the RF module 108 remains active for receiving messages, such as anomalies, from the sensor units 200, and the Wi-Fi module 110 may be temporarily disabled to save the battery power.

In some examples, when the input power from the power outlet is lost, the base unit 100 may operate in a sleep mode, in which the microcontroller 102 turns off the communication module 103 and only activates the one or more elements of the communication module 103 when necessary, and/or periodically.

In some examples, the base unit 100 may also include a status indicator 112. The status indicator 112 provides visual indication of the status of the environment. The status indicator 109 may be for example a LED light. The microcontroller 102 may control the colours of the status indicator 112, based on events of the base unit 100 or the sensed changes of the environment. In some examples, different colours of the status indicator 112 may indicate different status of the environment. In some examples, the status indicator 112 is green when the base unit 100 is connected with both cellular radio network and a Wi-Fi network; the status indicator 112 is yellow when the base unit 100 is connected with only the cellular radio network. In some examples, different colours may be used during the boot up process of the base unit 100 to indicate signal strength of the cellular radio network and a Wi-Fi network, so that properly location may be selected to place the base unit 100. In some examples, when the microcontroller 112 determines that based on the sensed data of a sensor unit 200, water is present within an area monitored by the sensor unit 200, or that the temperature of the area is above or below a defined threshold, the microcontroller 112 causes the LED light to have a first colour, such as a blue colour. If all of the environment variables changes within an acceptable range, the microcontroller 112 causes the LED light to have a second colour, such as a green colour. In some examples, when the input power to the base unit 100 from the premises is lost, the battery backup 116 supplies the power to the base unit 100 and the microcontroller 112 makes the LED light to become bright white and functions as a wayfinder or nightlight.

In some examples, the base unit 100 may include one or more environmental sensor module 120 (also referred to as "base unit environmental sensor module"). The environmental sensor module 120 are directly operably connected with the microcontroller 102, for example integrated within a same packaging of the base unit 100. In various example embodiments, the environmental sensor module 120 may be a temperature sensor for detecting and reporting the ambient temperature to the microcontroller 102. In some further example embodiments, the environmental sensor module 120 further be a humidity sensor for sensing and reporting the ambient humidity level to the microcontroller 102, and/or a liquid (e.g. water) sensor for sensing and reporting presence of water due to floods, leaks, and/or a power detector 160 for detecting outlet power. In some example embodiments, the base unit 100 does not use a liquid sensor, for example when the base unit 100 is a direct wall-mount, and so does not engage the ground.

In some examples, the base unit 100 may include a speaker 124 for generating audio signals. For example, the speaker 124 may generate a first beep to indicate that the sensor unit 200 has been detected and recognized by, and the identifier of the sensor unit 200 may be temporarily stored in memory or RAM of the base unit 100. The speaker 124 may generate a second beep to indicate that the sensor unit 200 has been registered with the server 300, and the identifier of the sensor unit 200 has been stored in persistent memory of the base unit 100. In an example embodiment, the first sound is accompanied by a first visual output such as a first LED color output from the base unit 100, such as green, and the second sound is accompanied by a second visual output from the base unit 100 such as a second LED color output (e.g., can also be green). If the sensor unit 200 is not successfully recognized by the base unit 100, the speaker 124 may generate a beep and an LED color output, such as a red colour. Once the sensor unit 200 has been registered with the server 300, the icon of sensor unit 200 may be displayed on a user interface, such as a dashboard. All of the beeps can be the same sound in an example embodiment. The beeps can be different sounds in other example embodiments.

In some examples, the WWAN module 106 of a base unit 100 is configured to report signal strength of available WWAN networks to the server 300. The user equipment 400 may use the signal strength information to indicate the signal strength of the available WWAN networks at one location of the premises. In some examples, the base unit 100 has a display screen for displaying signal strength of the available WWAN networks at the location of the base unit 100, for example for several minutes, so that a user can determine the optimal location for placing the base unit 100 in a premises.

In some examples, the base unit 100 may generate an audio and/or a visual signal to indicate the signal strength of the available WWAN networks. For example, if the signal strength of a WWAN network detected by the WWAN module 106 is below −100 dBm, the status indicator 112, such as a LED, of base unit 100 may be in a red colour; if the signal strength of a WWAN network detected by the WWAN module 106 is between 85 dBm to −100 dBm, the status indicator 112 may be in a yellow colour; if the signal strength of a WWAN network detected by the WWAN module 106 is above −85 dBm, the status indicator 112 may be in a green colour. Similarly, the base unit 100 may generate different sound from the speaker 124, for example, from a low volume to a high volume to indicate the strength of the signal strength from low to high.

Figure 3:
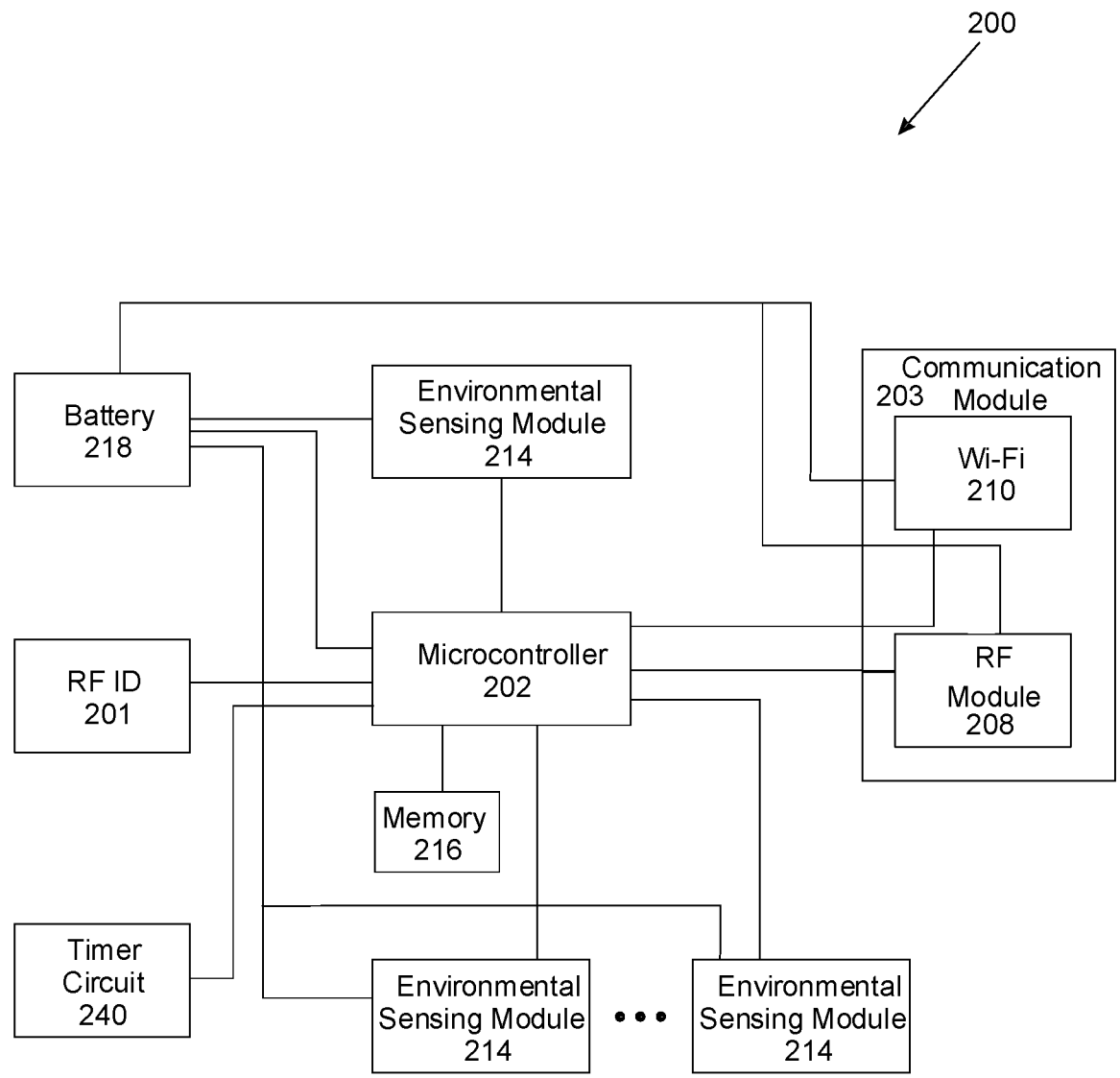
FIG. 3 is a block diagram of a sensor in FIG. 1, according to an example embodiment.

FIG. 3 illustrates an exemplary sensor unit 200. The sensor units 200 may be placed at different locations of a premise sensing and recording the changes of the environment. Some sensor units 200 may be placed at the same location as the base unit 100 in a premises for monitoring the surrounding environment of the base unit 100, and other sensor units 200 may be are placed at different locations of the premises as long as the sensor units 200 can communicate with the base unit 100. For example, the sensor units 200 may be placed behind a washer or dishwasher, near a hot water tank, a sump pump hole, or in other areas of interest. The sensor units 200 may be placed in different rooms of the premises, and/or on different floors of the premises. Example floors that are prone to alert events include the basement and the attic.

Each sensor unit 200 senses the environment of an area in a premises for one or more specific purposes such as power, humidity, temperature and liquid (e.g. water). For example, each sensor unit 200 senses temperature and water. In some example, the sensor unit 200 also senses humidity. The sensor units 200 may be waterproof. The sensor unit 200 may sense the presence of the water, or may sense the level of water above the sensor unit 200, for example, 1 mm, 3 mm or 5 mm.

By way of example setup at an example premises, a first sensor unit 200 senses temperature at a first area of a premises, and a second sensor unit 200 senses water and temperature at a second area of a premises, and a third sensor unit 200 senses water and humidity at a third area of a premises.

In some examples, the sensor unit 200 may report temperatures from −100.0° C. to 100.0° C. with an accuracy of one decimal place, and the microcontroller 202 may transmit temperatures as three hexadecimal characters. The environmental sensing module 214 may conduct a temperature reading, and the microcontroller 202 may convert the reading a hexadecimal. For example, the temperature reading from the environmental sensing module 214 is 24.5° C.; the microcontroller 214 adds 100 to the temperature reading to 124.5, and multiplies by 10 to generate a decimal integer 1245, which is further converted to a hexadecimal, such as "4DD".

In the example of FIG. 3, the sensor unit 200 may include an RF ID 201, a microcontroller 202, a communications module 203, at least one environmental sensing module 214, a power supply module 216. The microcontroller 202 is connected with and controls the communication module 203 and the at least one environmental sensing module 214. The sensor unit 200 includes a unique sensor ID, such as an alphanumeric 9 digit code or a MAC address of the sensor unit 200. In some example, microcontroller 202 may send the sensed environmental data, and the sensor ID to the microcontroller 102 periodically or real time.

The RF ID 201 contains an identifier uniquely associated with the sensor unit 200. When the sensor unit 200 is tapped to the base unit 100 or placed at a close proximity of the base unit 100, the identifier of the RF ID 201 is read by the RF ID reader 104 of the base unit 100.

The RF ID reader 104 works on the same frequency as the RF ID. The RF ID reader 104 sends the identifier to the microcontroller 102. The microcontroller 102 may then associate the sensor unit 200 with the identifier. The recognizing process will be described below In some examples, a sensor unit 200 may be removed from the base unit 100. The user equipment 400 may, via the server 300, send a text message to the base unit 100 to remove a sensor unit 200 with a specified sensor identifier.

The microcontroller 202 may include a processor/a CPU, a memory such as RAM, and input/output peripherals. In some examples, the microcontroller 202 receives commands from the microcontroller 102 of the base unit 100 via the communications module 203. The microcontroller 202 may then implement the commands from the microcontroller 102 of the base unit 100. The commands may include the sample rate of the environment by the sensor units 200, the running modes of the sensor units 200, and the reporting frequency to the base unit 100. In some examples, the microcontroller 202 receives sensed data (e.g. from environmental conditions) from the environmental sensing module 214, and sends the sensed data from the environmental sensing module 214 to the microcontroller 102 of the base unit 100 via a wireless communication channel established between the communication modules 103 and 203. In some examples, the microcontroller 202 may preliminarily process the data collected from the sensing module 204, for example, averaging the data for a specific period, and then send the preprocessed results to the base unit 100 via the communication module 203.

The communication module 203 provides communication channels or communication modalities between the microcontroller 202 of the sensor unit 200 and the base unit 100. The communication module 203 in the example of FIG. 3 includes an RF module 208 and a Wi-Fi module 210. The RF module 208 similar to the RF module 108, and the Wi-Fi module 210 is similar to the Wi-Fi module 110. The configurations of the RF module 208 and the Wi-Fi module 210 are similar to the RF module 108 and Wi-Fi module 110 as described above. The Wi-Fi module 110 may be used to communicate with the base unit 100, for example, for receiving software updates from the server 300. The RF module 208 of the sensor unit 200 and the RF module 108 of the base unit 100 is configured to establish a wireless channel at the frequency band, for example on the unlicensed frequency spectrum, such as 915 MHz. A sensor unit 200 and the base unit 100 may communicates with each other via the unlicensed frequency band or channel.

The Wi-Fi module 210 of the sensor unit 200 and Wi-Fi module 110 of the base unit 100 allows the sensor unit 200 to communicate with the base unit 100 via a Wi-Fi network. For example, the Wi-Fi network can be used as a backup to the unlicensed frequency spectrum for the microcontroller 202 of the sensor unit 200 to transmit sensed data from the environmental sensing module 214 to the microcontroller 102 of the base unit 100, and receive commands from the microcontroller 102 of base unit 100.

The microcontroller 202 may be configured to control the environment of a premises by way of another device or operable element that affects the environment. For example, based on the sensed data from the sensor units 200, the microcontroller 202 may turn on or turn off an A/C outlet to a pump, or to a water shutoff valve, etc.

The environmental sensing module 214 detects the environment of an area in which the sensor unit 200 is deployed. The sensed data is stored in a memory 216 of the sensor unit 200 and the microcontroller 202 has access to the memory 216 to process the sensed data. The sensed data includes, but is not limited to, temperature, water, light, motion, humidity, moisture, vibration, pressure, sound, gas, and other physical aspects of the environment. Each environmental sensing module 214 has a sensing range and accuracy, in an example embodiment. For examples, sensor unit 200 may measure all humidity ranges from 0-100% with an accuracy of 2%. The sensor unit 200 may have a sensing range for example, 1-10 meters radius from the sensor unit 200. In some examples, the environmental sensing module 214 is a liquid sensor (e.g. water sensor). In some examples, the water sensor has two conductive leads on one face of the casing of the sensor unit 200 (e.g. the bottom face), each conductive lead coupled to the water sensor. In some examples, the sensor unit 200 may have a jack on the side of the sensor unit 200 for water detection in a sump pump or across a span of distance. Water is detected when the presence of water closes the circuit between the two conductive leads and the water triggers detection of the water event. The closing of the circuit can also be used to activate or "wake-up" the microcontroller 202 of the sensor unit 200, thereby saving power when no water is detected.

The power supply module 216 supplies power to the sensor unit 200, such as the microcontroller 202, the communication module 203, and the environmental sensing module 214. In some example, the power supply module 216 contains one or more disposable batteries 218, such as CR2032 or AAA batteries. The batteries 218 can supply the power to the sensor units 200 for at least a desired period, such as six months. In some examples, the microcontroller 202 configures sensor unit 200 in a deep sleep mode to conserve battery usage while the sensor unit 200 is constantly or periodically sensing the environment. The microcontroller 202 may also configure the sensor unit 200 to wake up immediately when a predetermined threshold is reached. For example, the sensor unit 200 wakes up upon sensing the presence of water within the detecting range of the environment of an area. In some example, the sensor unit 200 wakes up periodically or at specific scheduled time to report the sensed data to the microcontroller 102 of the base unit 100, such as temperature of the environment (or other environmental variables). In some examples, the sensor unit 200 may report the remaining battery life to the base unit 100 and in response the base unit 100 may be configured to report the remaining battery life to the user equipment 400.

The sensor units 200 may be passive and only report or transmit the sensed data to the base unit 100, but does not receive commands from the base unit 100. The sensor units 200 may support bi-directional communication between the base unit 100 and the sensor units 200. For example, the sensor unit 200 both reports or transmit the sensed data to the base unit 100 and receives commands from the base unit 100. In an example, as a default, such wireless communications between the sensor units 200 and the base unit 100 use the unlicensed frequency spectrum, and bypass (do not use or require) any short range communication protocol or Wi-Fi Network.

In some examples, the server 300 may notify the user, for example, by sending an email to the user equipment 400 if a sensor unit 200 has not transmitted data for a predetermined period.

Other example embodiments of the configurations of the base unit 100 and the sensor units 200 will now be described. For example, the RF modules 108 and 208 may not be included in both the base unit 100 and the sensor unit 200. In some examples, the base unit 100 may include more than one status indicator 112 and the sensor unit 200 may include more than one sensing module for sensing different aspect of the external environment.

In use, after the base unit 100 is removed from the packaging, base unit 100 is power on, for example, with a battery of the battery backup 116 or electricity supply from an outlet by plugging the base unit into an electrical outlet, for example, on a wall. In an example, the base unit 100 is power on with a user removing a tab that prevents the battery in the base unit 100 from powering the base.

Figure 7:
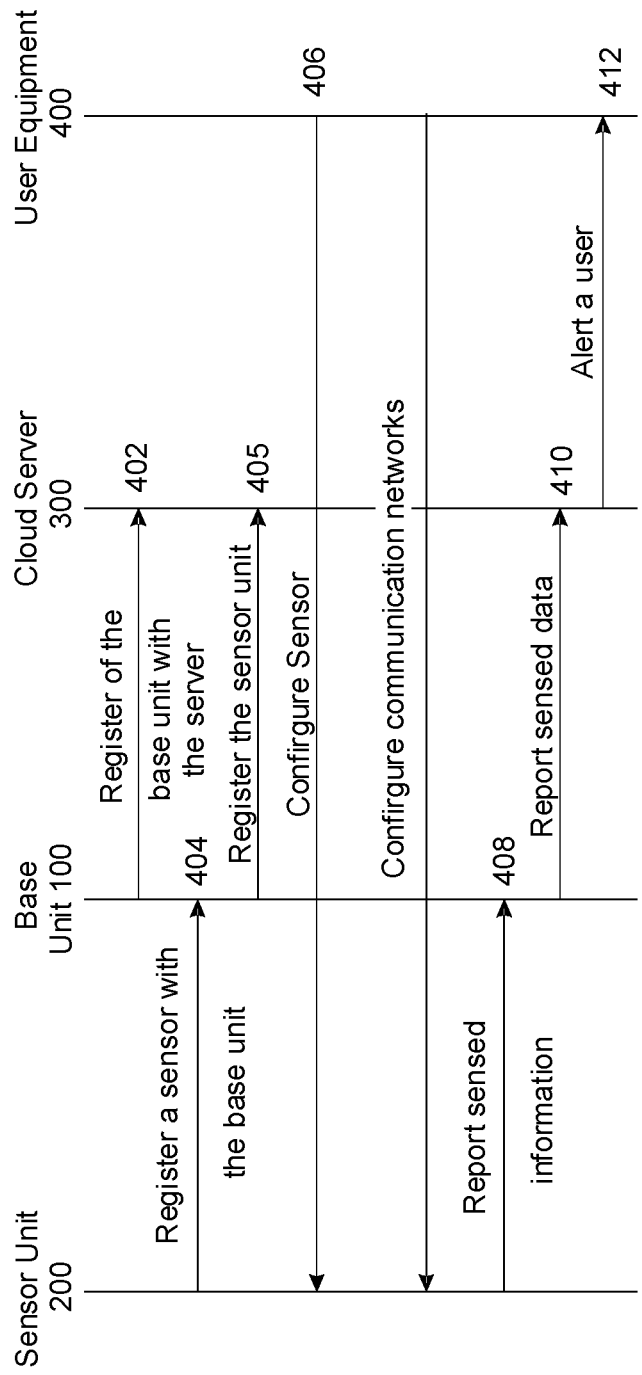
FIG. 7 is a flow chart illustrating example communications of the system of FIG. 1.

After the base unit 100 boots up with the electricity supply from a power outlet or a battery, the base unit 100 may connect to a cloud service provided by the cloud server 300. As illustrated in FIG. 7, a user may use an electrical user equipment 400, such as a laptop, a smart phone or a tablet, to access the server 300, for example, by a user interface such as a dashboard supported by a web-portal provided by the server 300. The user equipment 400 may open a web browser, such as Internet Explorer or Chrome, to register the base unit 100 with the server 300 via the interface. The user may register the base unit 100 with the server 300 by providing the user interface a custom code, for example, a 9 digit code, that is assigned to and uniquely identifies the base unit 100 (Step 402).

The interface may provide a setup sequence to guide a user to complete the registration of the base unit 100 with the server 300. In some examples, the user may provide additional information such as name for the base unit 100, location of the base unit 100, etc., to the server 300. In some examples, the user may provide cell phone numbers for the server 300 to reach the user by text message using SMS of a WWAN, and email addresses for the user to receive alerts from the server 300. The cell phone number and the emails addresses may be associated with the relevant people of a premises in which the local sensing system 20 is deployed, for example, the owner of the premises, friends of owner, landlord of the owner, or the neighbors of the owner. In addition to text messages and emails, the user may access the information provided by the base unit 100 from server 300 in various manners, including a website directed to the server 300, mobile applications connected with the server 300, or by asking Google Home, Alexa, etc. In some examples, server 300 is configured to interact with external sensor units, such as Ecobee™, Samsung™ smartthings, or Honewell™.

Next, the user may cause a sensor unit 200 to be recognized by the base unit 100 (step 404), for example by detecting the sensor unit 200 as being in proximity to the base unit. For example, once a sensor unit 200 is tapped on the base unit 100 or placed in a close proximity sufficient for the RF ID reader 104 of the base unit 100 to read the identifier contained in the RF ID 201, the identifier associated with the RF ID 201 of the sensor unit 200 is read by the RF ID reader 104 of the base unit 100. The RF ID reader 104 may forward the identifier to the microcontroller 102 of the base unit 100. If the microcontroller 102 determines that the identifier does not exist in its memory 130 and that the sensor unit 200 associated with the identifier has not recognized or registered with any other base units (e.g. using resident memory 130 and/or verification from the server 300), the microcontroller 102 stores the identifier of the sensor unit 200 in its memory 130. The base unit 100 may also send a base unit identifier (e.g. hexadecimal identifier, MAC address) to the sensor unit 200, for storing in memory of the sensor unit 200. After the sensor unit 200 is recognized with the base unit 100 and the identifier of the sensor unit 200 has been stored in the memory 130, the sensor unit 200 may send further information to the base unit 100, such as the MAC address of the sensor unit 200. As such, the sensor unit 200 is now paired or registered with the base unit 100. By making the sensor unit 200 registered in the base unit 100, the microcontroller 102 recognizes the sensor unit 200 by associating the sensor unit 200 with the sensor identifier to uniquely identify the sensor unit 200 in the base unit 100. It should be appreciated that in addition to the RF ID near field communications technologies, the sensor unit 200 may send its unique sensor identifier to the base unit 100 via any other short range communication protocols, such as infrared or Bluetooth™. In some example embodiments, the RF ID is a passive RF ID, while in other example embodiments the RF ID is an active RF ID.

If the sensor identifier is already associated with previous base unit 100, a request can be sent to user equipment associated with the previous base unit 100, to query whether the sensor unit 200 can now be registered to the new base unit 100. In an example embodiment, each of the sensor units 200 are exclusive in that they may only be paired with one base unit 100.

In some examples, the base unit 100 may generates signals to show that the sensor unit 200 has been recognized by the base unit 100. For example, the base unit 100 may generate a beep and flash the LED 112 to indicate that the sensor unit 200 has been recognized by and registered with the base unit 100, and saved to memory.

After the sensor unit 200 is recognized by the base unit 100, the base unit 100 sends the information of the sensor unit 200, such as identifier contained in the RF ID 201 or the MAC address of the sensor unit 200 to the server 300. The server 300 may store the information of the sensor unit 200 on the memory of the server 300, so that sensor unit 200 is registered with and recognized by, or paired with, the server 300, and the sever 300 therefore recognizes the sensor unit 200 and its association (registration) with the base unit 100 (Step 405).

After the sensor unit 200 has been registered with the base unit 100 and the server 300, all of the subsequent communications between the sensor units 200 and the base unit 100 contain at least one of the sensor identifiers to indicate the source of the data, namely from the sensor unit 200.

Additional sensor units 200 may be added to the base unit 100 by the same process described above.

After the sensor unit 200 has been registered with the base unit 100 and the server 300, the server 300 may initiate a user interface, such as a dashboard, on the user equipment 400. The user equipment 400 may communicate with the server 300 using a dedicated application or "app", or have a generic application such as a web browser, and use such programs to display the user interface. The information that the sensor unit 200 has registered with the base unit 100 is shown on the user interface on the electronic user equipment

400. For example, an icon of a registered or detected sensor unit 200 will appear on the user interface. Dashboard is provided to the electronic user equipment 400 to display the information of system 10.

Figure 4D:
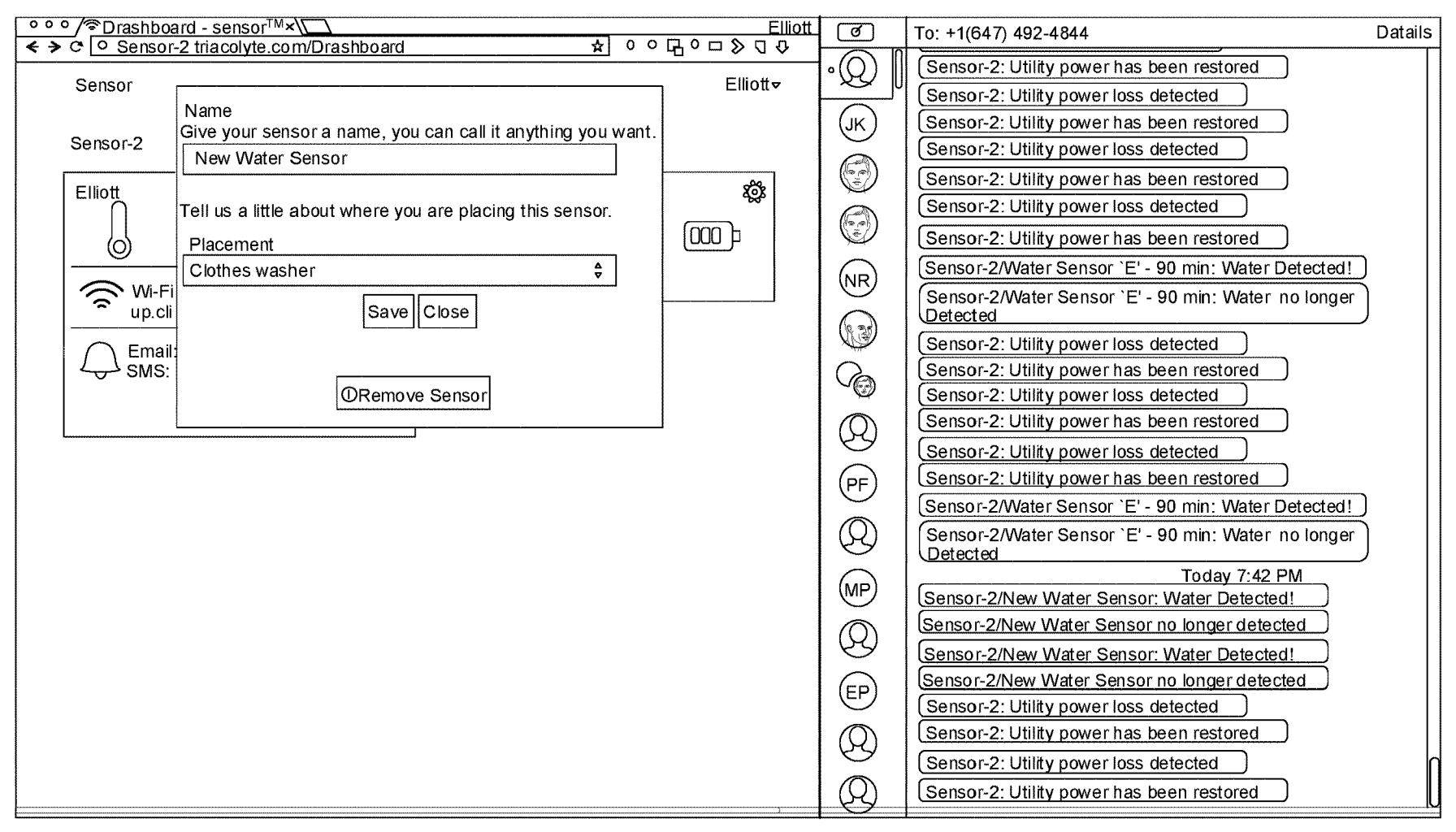
Figure 4E:
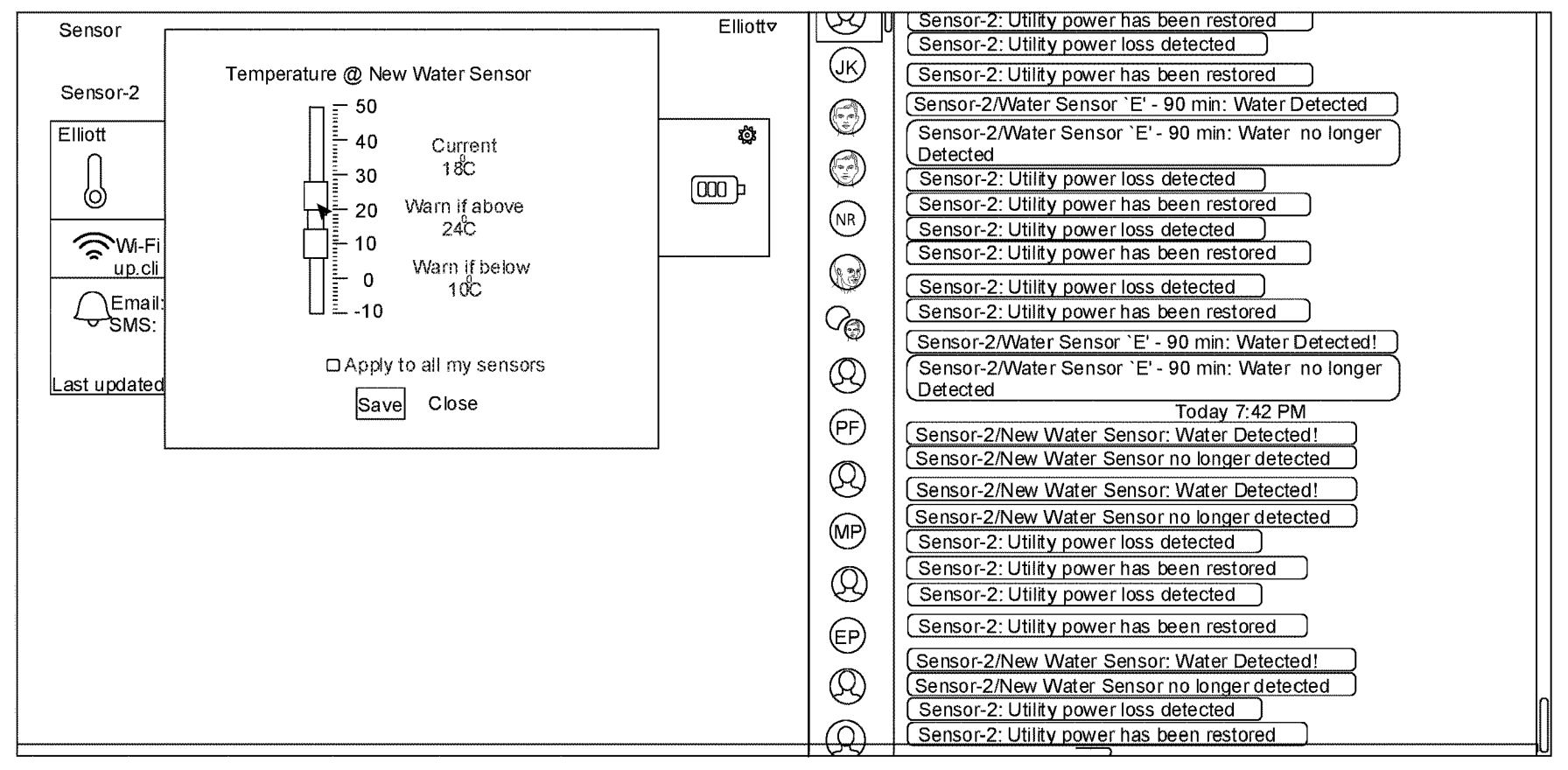

The user may configure a registered sensor unit 200 on the dashboard displayed on the user equipment 400 (Step 406). In some examples, the user may assign a name to a registered sensor unit 200, as shown in FIG. 4D. As well, the user may set alert parameters of the registered sensor unit 200 on the dash board which is associated with the server 300. The user may choose the desired alerts to receive and the manners of sending the alerts. For example, the user may select to receive a text message on a user equipment 400 from the server 300 via SMS of a WWAN, or an email at the email address provided in the case of a water leak, power outage, or an unexpected temperature change. In some examples, the power outage may be detected by the microcontroller 102 from the charging circuit 114, or the base unit 100 may include a power sensor, or the power detection circuit, to detect the power supply status for the power outlet. FIG. 4E shows an exemplary user interface for setting temperature configuration of the sensor unit 200. These alert parameters may be stored on the server 300.

In some examples, the alert parameters are set for one sensor unit 200 at a time or all registered sensor units 200 at the same time, for example, via the RF modules 108 and 208. In some examples, the alert parameters are a threshold of a particular environmental variable defined using the user equipment, and an alert is sent to in response to the threshold exceeding the threshold (or going below, as appropriate). As well, a combination of environmental variables can be calculated and determined as exceeding a combined threshold (or going below, appropriate), for example outlet power fluctuations can be accompanied by dimming of lights, loss of temperature. In an example, a combined threshold is based on data sensed from two or more of the sensor units 200, or data sensed by one sensor unit 200 and by the base unit 100. In some examples, the particular alert parameters are set by a system administrator, the server 300, regulatory or government requirements, or automatically determined using machine learning.

In some examples, the user equipment 400 may set operating parameters of a sensor unit 200, such as sampling rate of the sensor, and reporting frequency of the sensor. The user equipment 400 may implement the operating parameters by sending them, via the interface of the server 300, to the microcontroller 102 of the base unit 100. The microcontroller 102 may then forward the operating parameters to the microcontroller 202 of the sensor unit 200 for implementing the operating parameters.

After the sensor units 200 have been detected and recognized in the base unit 100 and configured, a user may select to connect the base unit 100 and the sensor units 200 to a communication network (step 407), such as a using RF modules 108 and 208. In some examples, a user may, at any time, select to connect the base unit 100 to a Wi-Fi network before the sensor units 200 have been detected and recognized in and configured in the base unit 100.

In an example, the user selects or clicks on a Wi-Fi configuration button on the user interface, such as a dashboard, displayed on the electronic user equipment 400 to initiate a Wi-Fi network selecting process. In response to the section or click, the server 300 sends a real time text message to the base unit 100. The server 300 may, via the microcontroller 102, request the Wi-Fi module 110 to scan available Wi-Fi networks and to provide the name of the available Wi-Fi networks. In some examples, if the base unit 100 is uses a Wi-Fi network when the server 300 sends the real time text message, the base unit 100 disconnects the Wi-Fi network in use before scanning available Wi-Fi networks, and then reconnects to the previous Wi-Fi network for sending the scan results to the server 300.

Figure 5A:
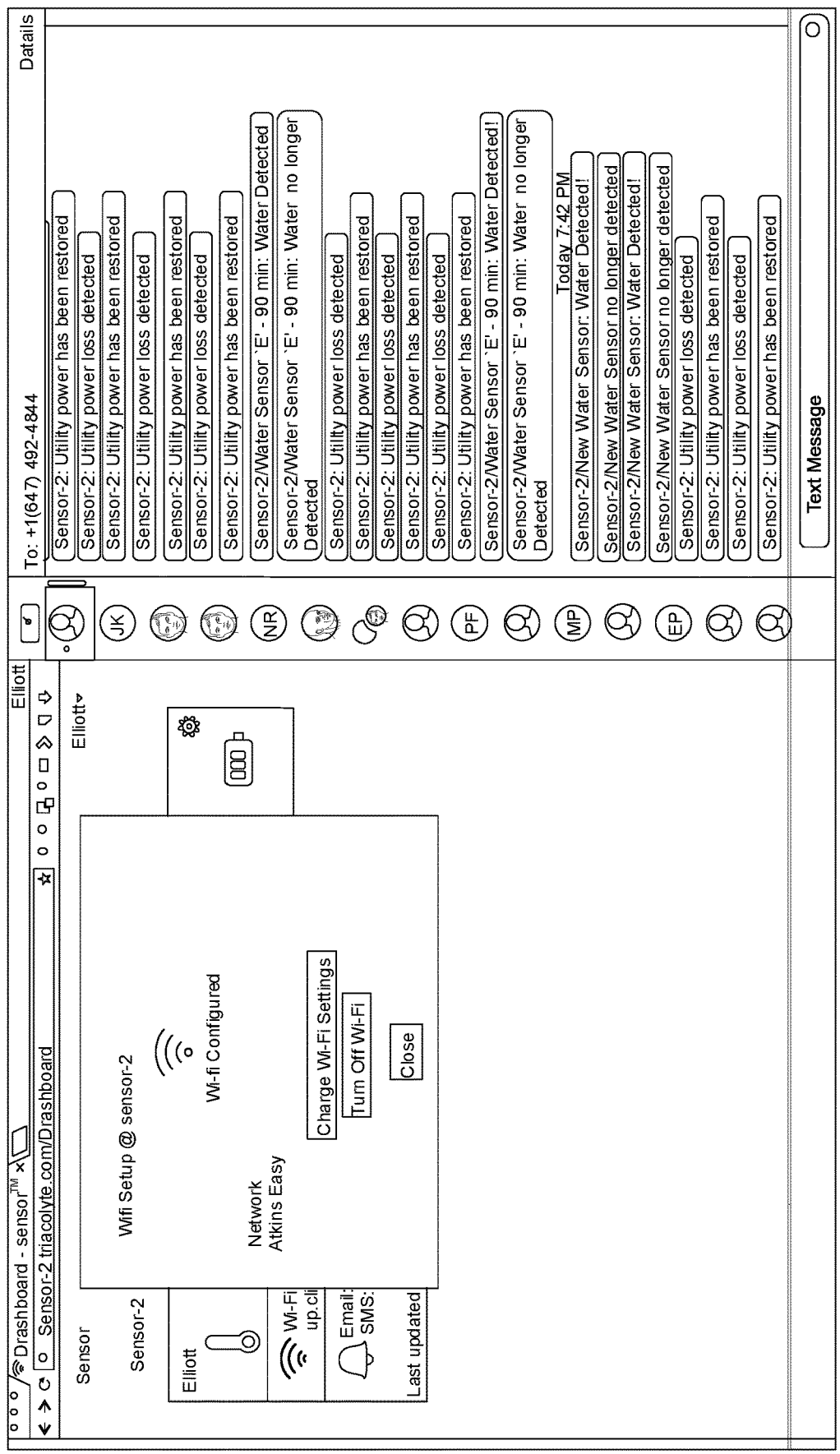

In some examples, in response to the user's selection of the Wi-Fi configuration button, the base unit 100 generates an audio and/or visual indication to show that the base unit 100 starts scanning available Wi-Fi networks in the premises, as shown in the example of FIG. 5A For example, the base unit 100 may generate a beep sound and/or flash the LED 112 to indicate that the base unit 100 is scanning for available Wi-Fi network.

Figure 5B:
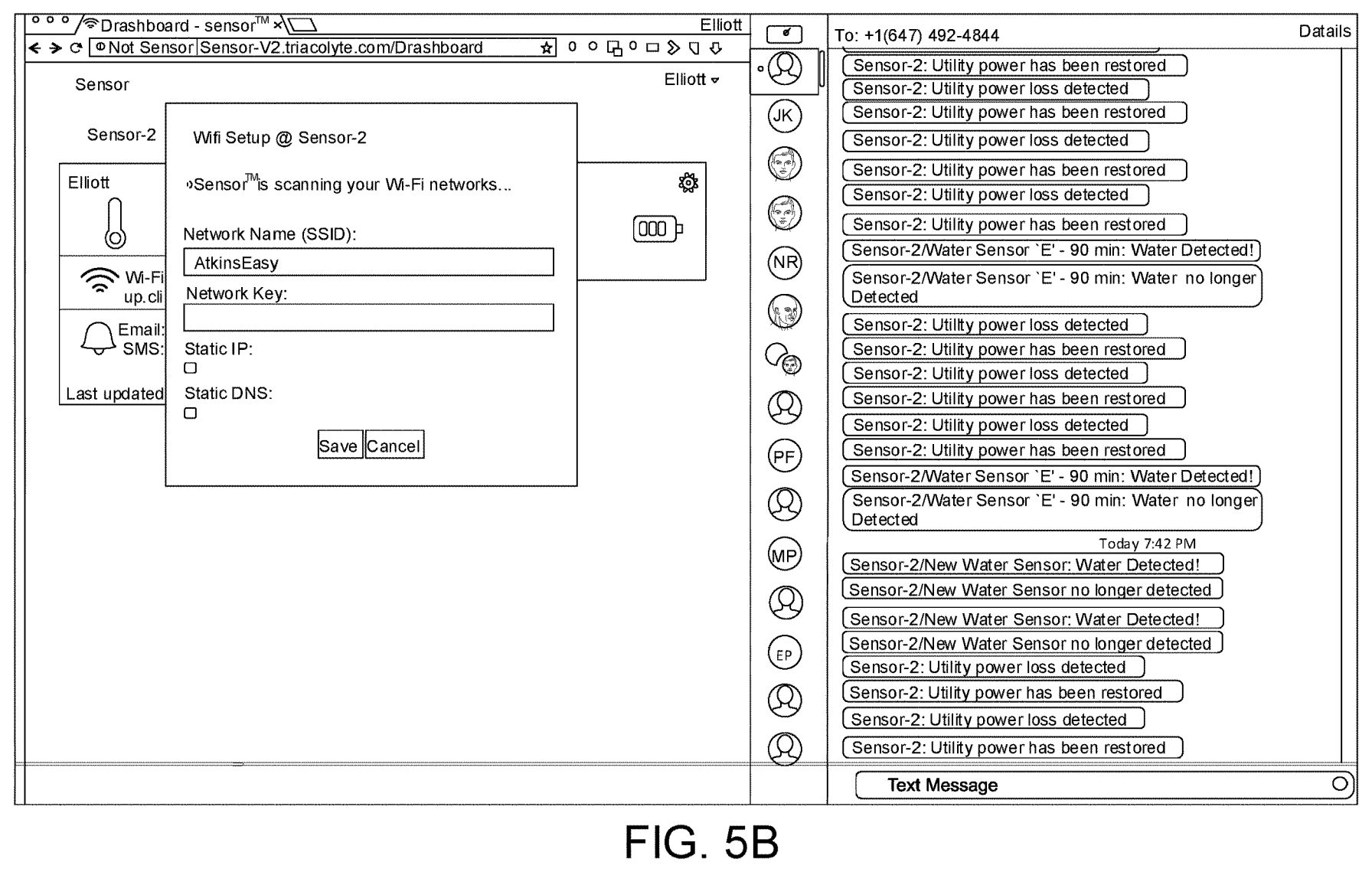
Figure 5C:
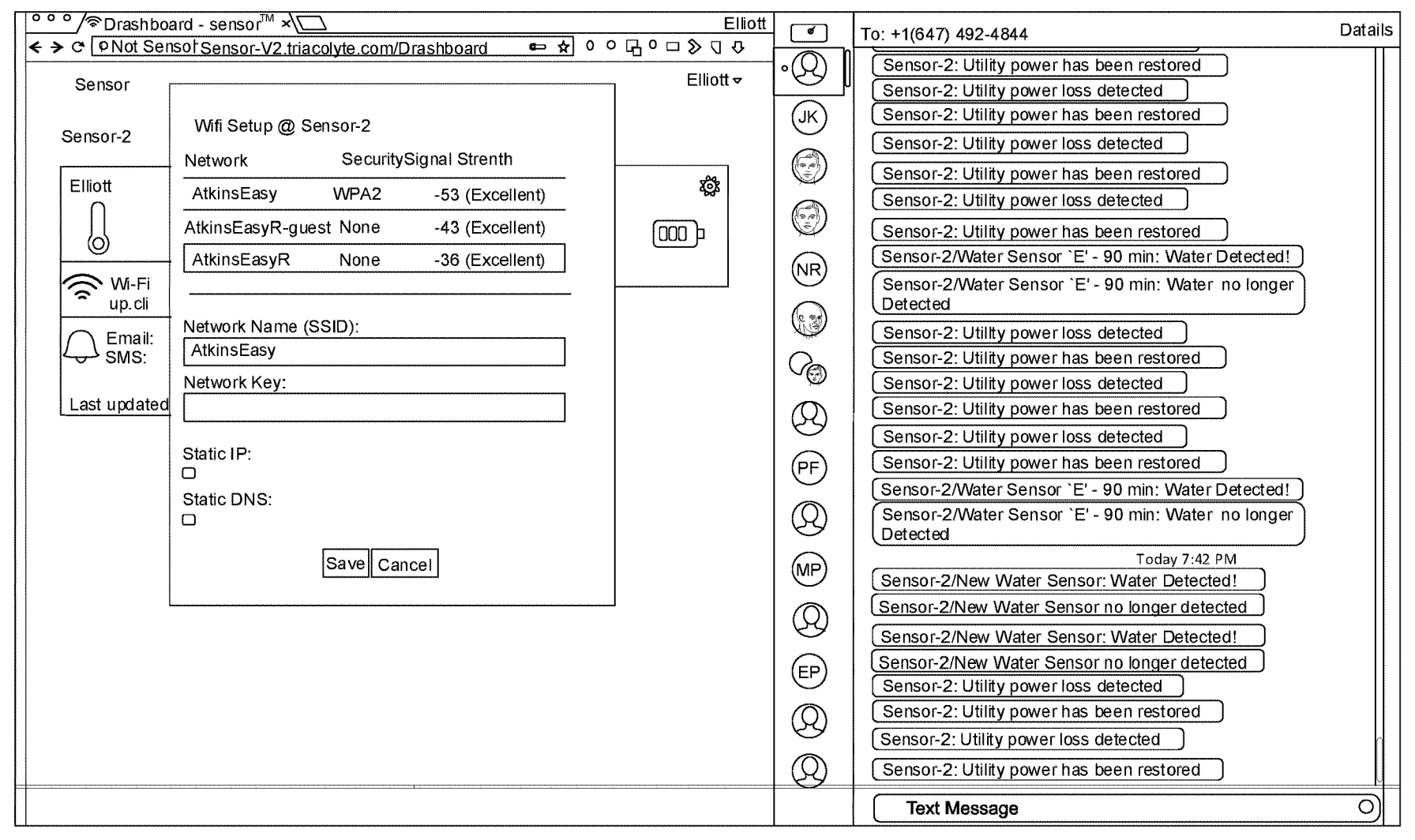

In some examples, the base unit 100 scans available Wi-Fi network and forwarded the information of the Wi-Fi networks to the server 300. The server 300 sends the name of the available Wi-Fi networks to the user equipment 400 on the user interface for the user to select a Wi-Fi network, providing login credentials, such as password, in order for the base unit 100 to use the selected Wi-Fi network. For example, the available networks are listed on the dashboard of the electronic user equipment 400. As shown in FIGS. 5B-5C, the user may select the name of an available Wi-Fi network, enters their password, and save the selected Wi-Fi network and the password to the server 300. The base unit 100 receives the selected Wi-Fi network and the login credentials from the cloud service provided by the cloud server 300, stores the selected Wi-Fi network and the login credentials in memory 130 of the base unit 100. As such, with the information of the selected Wi-Fi network and the login credentials, the base unit 100 is connected to the selected Wi-Fi network for subsequent wireless communication. In some example, the LED 112 of the base unit 100 may indicate that the base unit 100 has successfully connected to the Wi-Fi network, for example, by flashing with a different color and/or an audible output such as a beep.

In some examples, when a Wi-Fi network is not functioning for a period or the base unit 100 cannot log into the Wi-Fi network, the sever 300 may command the base unit 100 to disconnect from the Wi-Fi network by sending a text message, such as "WIFI-CLEAR" via SMS.

If a Wi-Fi network becomes unavailable for a predetermined period, the microcontroller 102 may report this event to the server 300. The server 300 may notify the user equipment 400, for example, via emails. The server 300 may also instruct the microcontroller 102 to remove the Wi-Fi network from the available network list.

In some examples, the sensor unit 200 is configured to use a wireless channel for communication, such as unlicensed frequency spectrum, for example, on 915 MHz. A power outage usually accompanies failure of a router, resulting in loss of the Wi-Fi network. In some examples, the unlicensed frequency spectrum is the default setting, and the sensor unit 200 may automatically use a backup wireless modality such as the Wi-Fi network if the unlicensed frequency spectrum is not available.

Referring still to the backup Wi-Fi option of the sensor unit 200, in some example embodiments, once the base unit 100 has connected to the Wi-Fi network via the Wi-Fi module 108, the micro-controller 102 of the base unit 100 may send commands to the sensor units 200 detected and recognized in the base unit 100 for the sensor unit 200 to connect with the Wi-Fi network. The commands may include the name of the selected Wi-Fi network, the login credentials to the Wi-Fi network. Accordingly, with the commands from the base unit 100, the sensor units 200 may be configured to access the same Wi-Fi network with the Wi-Fi module 210. As well, a respective address such as an IP address (static or dynamic) can be exchanged between the base unit 100 and the sensor unit 200, and stored in each other's respective memory. As such, the base unit 100 and the sensor units 200 may communicate with each other by the same Wi-Fi network via respective W-Fi modules.

Other redundancies of wireless modalities can be used in other example embodiments.

In some examples, when Wi-Fi is not available, the other wireless communication modalities are still used as a default. If after a period of time (days), the base unit 100 is still unable to connect to a Wi-Fi network, for example due to a network name change or password change, the electronic user equipment 400 may receive an alert and a link from the base unit 100. By clicking the link, the base unit 100 may rescan available Wi-Fi networks at premises. The availability of a Wi-Fi network may not affect the connectivity between the base unit 100 and the sensor units 200. For example, the sensor units 200 may not need to re-detected and re-recognized in the base unit 100 if an available Wi-Fi network becomes unavailable or if no W-Fi network is available.

With the communication network established between the sensor units 200 and the base unit 100, the sensor units 200 may report sensed data to the base unit 100 (Step 408). As each sensor unit 200 is associate with a unique sensor identifier contained in the RFID 201 or a MAC address, both registered in the base unit 100 and the server 300, the sensor unit 200 sends the sensed data to the base unit 100 containing at least the identifier, so that the base unit 100 may associate received data from the sensor unit 200 with the specific sensor unit 200.

The base unit 100 may send the sensed data to the server 300, via the WWAN via the WWAN module 106 (Step 410). In example embodiments, the WWAN is the default and another communication modality is the backup. Other wireless modalities or backup modalities may be used, such as the Wi-Fi network. A power outage usually accompanies failure of a router, resulting in loss of the Wi-Fi network.

As described above, the base unit 100 is registered with server 300 by providing a unique base unit identifier, such as custom code, hexadecimal number, or its IMEI. The base unit 100 may send the sensed data from the sensor unit 200 to the server 300 by adding its custom code in the sensed data. As such, the server 300 knows the source of the sensed data, such as from a specific sensor unit 200 and a specific base unit 100. In some examples, the microcontroller 102 may preliminarily process the sensed data from a sensor unit 200 and only sends the processed results to the server 300, together with identifier of the sensor unit 200 and the custom code of the base unit 100.

Figure 6A:
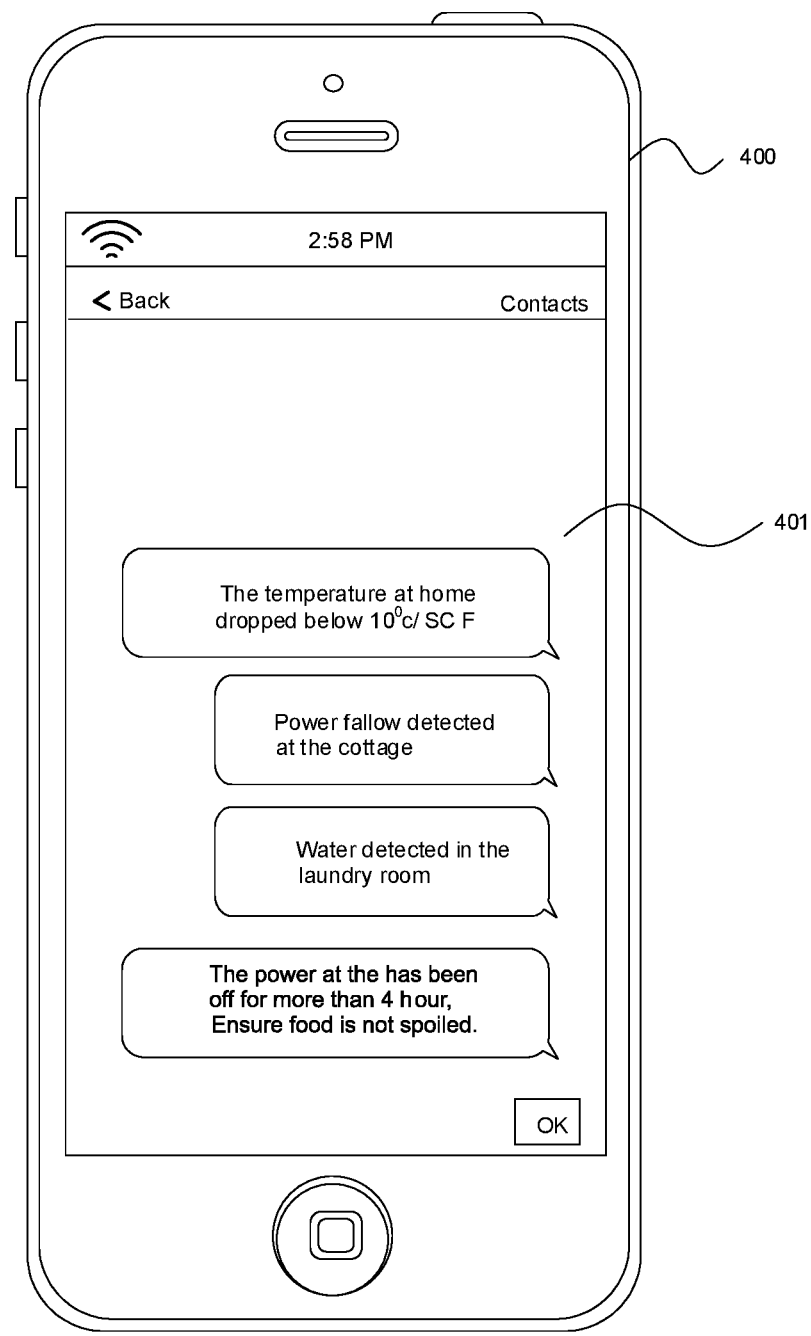
Figure 6B:
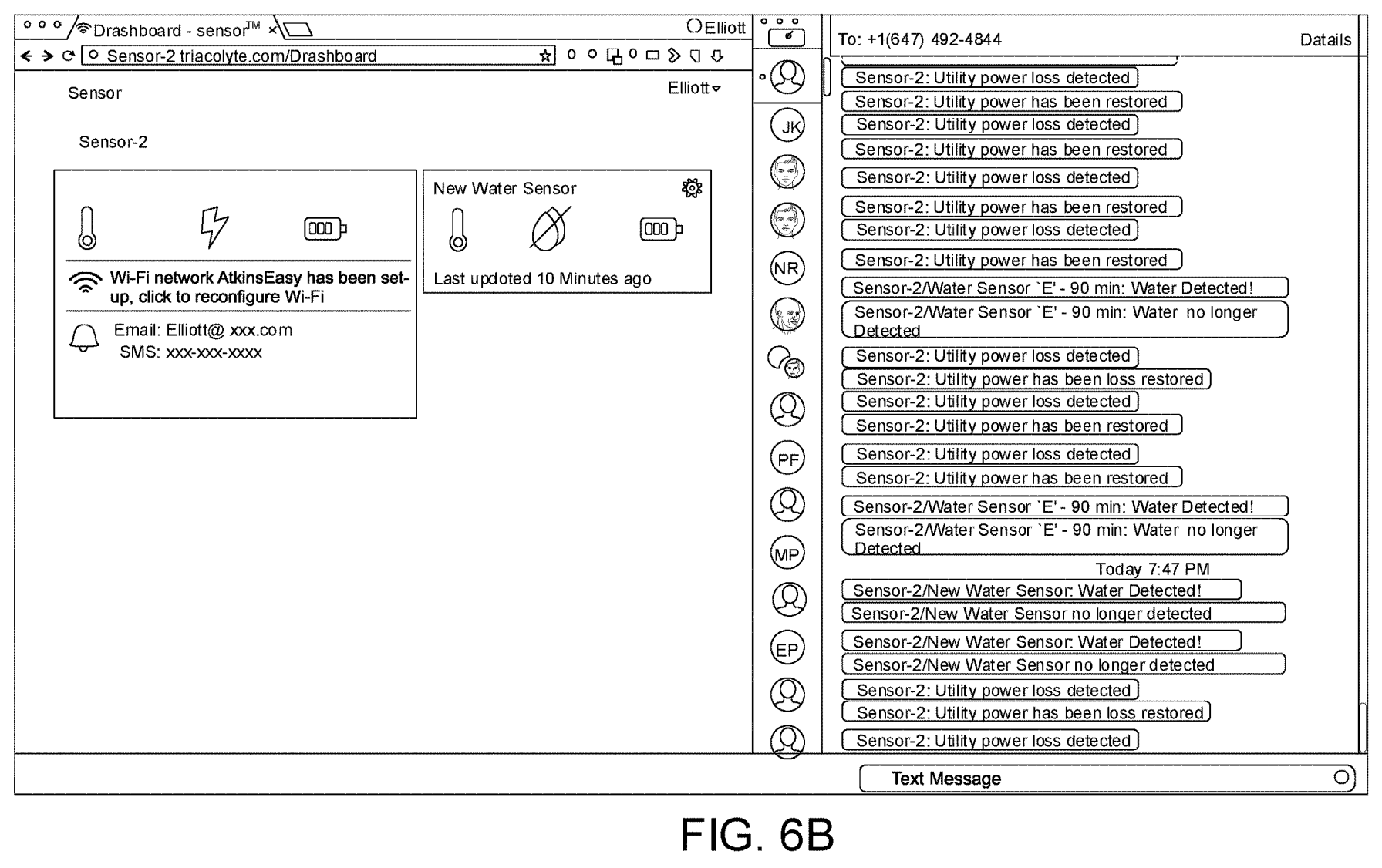
Figure 6C:
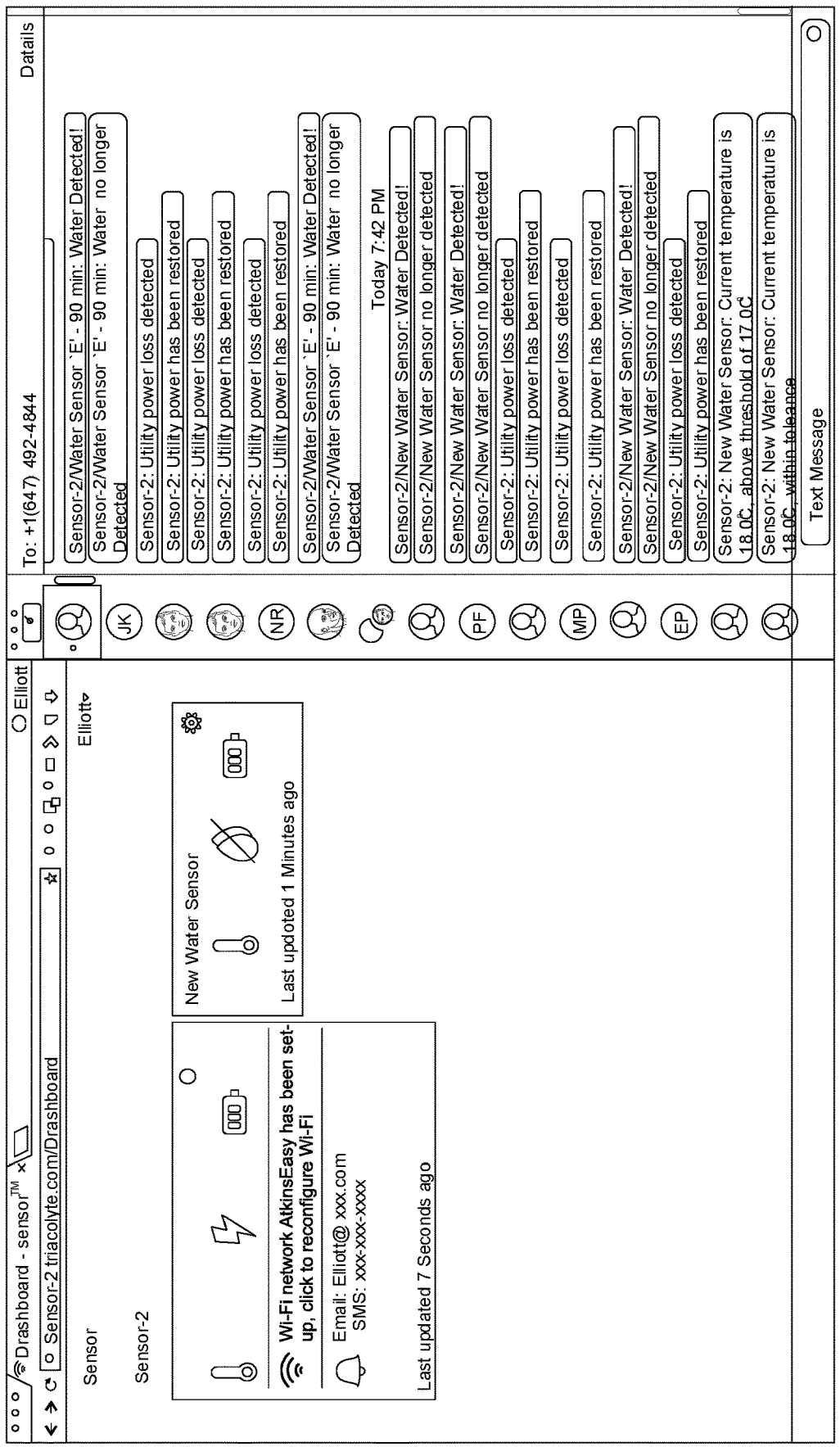

The server 300 may then process sensed data received from the base unit 100. For example, the server 300 may compare the sensed data with the alert parameters set by the user to determine whether an alert should be sent to on a user interface 401 displayed on a user equipment 400, as illustrated in FIG. 6A. As shown in the example of FIGS. 6B-6C, a sensor unit 200 may detects power outage, water leak, and the temperature at the same time.

In an example, all of the communication from the server 300 to the electronic user equipment 400 may indicate the name or identifier of the base unit 100, the name or the identifier of the sensor unit 200, and the type of error condition. For example, the communications may include the message of "House/dishwasher sensor/water detected" or "Cottage/Main Rm. Sensor: Current temperature is 23.0° C., above threshold of 20.0° C.", or a location "Toronto/Home/Dishwasher". This information allows a user to quickly and readily recognize a problem condition and its associated locations, especially when a user has multiple base units 100 at different premises and multiple sensor units 200 per base unit 100.

At event 412, the server 300 may send an alert to the electronic user equipment 400 when the alert conditions defined in the user equipment 400 are triggered. For example, an alert is triggered when the sensed data, such as temperature or humidity, from the sensor units 200 has go beyond the acceptable range as defined on by the user. For example, when an alert is triggered in server 300, the server 300 may send the alert to the electronic user equipment 400, such as by a text message via the SMS service for example by Twilio™, or by an email. The server 300 may also change in status colour in the user interface, such as on the dashboard, or pup up windows or messages on the user interface displayed on the electronic user equipment 400. When the sensed data becomes within the acceptable range, or when the power is restored, the server 300 may send another alert to the electronic user equipment 400 to in the same manners.

In some other examples, the base unit 100 processes the data relating to the environmental variables and determines the alert conditions, and notifies the server 300, who in turn notifies the user equipment 400. In some other examples, each sensor unit 200 is configured to process its own sensed environmental variables and is configured to determine the alert conditions, and notifies the base unit 100, who in turn notifies the server 300, who in turn notifies the user equipment 400.

In some examples, the server 300 may instruct a base unit 100 or a sensor unit 200 to reboot, for example, by sending a command in a text message via the SMS service from the server 300 to the base unit 100. When the base unit 100 receives the command for the base unit to reboot, the microcontroller 102 of the base unit 100 performs the reboot. If the command is for a sensor unit 200 registered under the base unit 100 to reboot, the microcontroller 102 may forward this command to the microcontroller 202 of the sensor unit 200 to reboot.

The wake up (active) mode and the low power mode of the sensor unit 200 will now be described. In some examples, if a sensor unit 200 senses a water leak, the sensor unit 200 is configured to immediately wake up and communicate sensed water leak to the base unit 100. The sensor unit 200 may include a switching circuit that is used to connect and disconnect power to the circuits/subsystems of the sensor unit 200. The switching circuit can be controlled by a timer circuit 240. In a low power mode, for example, the timer circuit 240 controls the switching circuit to completely disconnect the power to other components of the sensor unit 200 when not in operation. Periodically, the timer circuit 240 may wake up and power on the sensor unit 200. When the sensor unit 200 needs to turn off, the microcontroller 202 has general-purpose input/output (GPIO) pins that are designated for causing the switching circuit to disconnect all power. In the low power mode, the sensor unit 200 consumes less energy, such as battery power, as compared to the wake up mode which powers all circuits of the sensor unit 200. In an example of the wake up mode, water closes the contact on the pins of the water sensor on the sensor unit 200, and this effectively closes a contact on the timer circuit 240 which causes a manual wake up mode. The sensor unit 200 therefore powers on again until the microcontroller 200 turns off the sensor unit 200 (e.g. based on a periodic time interval or some other criteria). In order to alert the user of the sensed alert condition, the base unit 100 may then communicate with the server 300 via the a communication network, such as a Wi-Fi network or the data services of the WWAN. The server 300 may send the alert to the electronic user equipment 400 in the same manner(s) described above. The base unit 100 in this case may generate a sound, or change the color of the LED 112. In an example, the base unit 100 may generate a beep sound and the LED 112 may turn blue to alert the user to check their dashboard to find out the contents of the error condition and the sensor that generates the error condition. As such, if a user is at the premises but not actively monitoring the electronic user equipment 400, the user will still be alerted to a water leak.

In the case of water leak, the sensor unit 200 may be configured to continuously report the presence of water until the relevant area becomes dry.

In an example, all calls from the base unit 100 to the server 300 may be accompanied by a set of HTTP headers. For example, a HTTP header contains the following information shown in Table 1.

TABLE 1

| Name | Value | Remarks |
| --- | --- | --- |
| Authorization: | Basic <AuthToken> | The AuthToken is required to identify and verify a device is allowed to communicate to the server. This token is created by performing a SHA256 HASH of "<IMEI>:<Timestamp>" using "<ICCID>" as the HMAC, then encoding with Base64. |
| Content-Type: | application/syndii | |
| Content-Length: | <Length of Body> | Only required for HTTP POST requests. |
| OL-IMEI | <IMEI> | The unique 15-digit IMEI of the cellular module contained in the device. |
| OL-Connection: | "W" or "C" | If the device has transmitted the request using Wi-Fi, then "W" is sent. Otherwise, "C" is sent. |
| OL-Timestamp: | <Timestamp> | The number of seconds the device has been turned on since last boot. |

In another example, the base unit 100 may send a message periodically to update the server with the latest temperature, power, and water readings, in the following format shown in Table 2.

TABLE 2

| Description | Format | Remarks |
| --- | --- | --- |
| Start Device Record | "D" | Start sentinel for the device record. Exactly one device record must be reported. |
| Record Version | "01" | Informs the server what structure of device record is being transmitted. |
| Temperature (Celsius) | TTT | The ambient temperature at the device. If temperature is not reported, send as FFF. |
| Flags | XX | Wi-Fi Configured - 32 [0x20]<br>Wi-Fi Operational - 64 [0x40]<br>A/C Power Present - 128 [0x80] |
| Battery Remaining (%) | XX | The amount of battery remaining represented as a percentage. If battery remaining is not reported, send as FF. |
| Cell Status | XX | Bitwise OR of these status codes.<br>0x01 Path ready (Cellular registered and in READY state)<br>0x02 Path connected (Cellular registered, whether READY or not)<br>0x04 Path has ever been ready (Cellular has been registered with the network at some point since boot; applies whether currently registered or not)<br>0x08 Path has recently been ready<br>0x10 Path is on a communications timeout<br>0x20 Communication has been attempted on this path (since boot, potentially including this message)<br>0x40 Communication has been successful on this path (since boot, false if this message is the first on this path or if the path has never been used successfully) |
| Cell RSSI | XX | The received signal strength indicator. The RSSI should be a value between 0 and −120. A negative value is assumed and therefore send an absolute value. For example, −80 db is sent as 0x50. |
| Wi-Fi Status | XX | Bitwise OR of these status codes:<br>0x01 Path ready (WiFi connected and not on timeout)<br>0x02 Path connected (WiFi connected, whether on timeout or not; does not necessarily indicate that the WiFi network has internet connectivity)<br>0x04 Path has ever been ready (successfully connected to this SSID since configuration/boot)<br>0x08 Path has recently been ready<br>0x10 Path is in a communication timeout period (WiFi is connected, but a previous attempt to reach the server failed on the WiFi path, so it's marked for a timeout)<br>0x20 Communication has been attempted on this path (since boot/configuration, potentially including this message)<br>0x40 Communication has been successful on this path (since boot/configuration, false if this message is the first on this path or if the path has never been used successfully) |

TABLE 2-continued

| Description | Format | Remarks |
| --- | --- | --- |
| Wi-Fi RSSI | XX | The received signal strength indicator. The RSSI should be a value between 0 and −120. A negative value is assumed and therefore send an absolute value. For example, −80 db is sent as 0x50. |
| WiFi SSID Length | XX | Length of the WiFi SSID field in bytes. |
| WiFi SSID | A? | The name of the currently-configured WiFi SSID (or null if none configured), base64 encoded. |
| IP Address | A[15] | Current IP address in dotted-quad notation, left-justified |
| Netmask | A[15] | Current netmask in dotted-quad notation, left-justified |
| Gateway | A[15] | Current gateway address in dotted-quad notation, left-justified |
| DNS1 | A[15] | DNS nameserver #1 address in dotted-quad notation, left-justified |
| DNS2 | A[15] | DNS nameserver #2 address in dotted-quad notation, left-justified |
| <End of Record> | \n | End sentinel for the device record. After the sentinel is received, any number of other records may follow in any order. |
| Start Sensor Record | "S" | Start sentinel for a sensor record. Multiple records can be reported in any order. |
| Sensor Type | "01" | Instructs the server that the data contained in this record is to report on the first version water/temperature sensor. |
| Sensor ID | X[12] | The ID of the sensor being reported (this is the MAC address of the sensor). The ID should be left padded with zeroes if it does not consume the allocated space. |
| Temperature (Celsius) | TTT | The ambient temperature at the sensor. If temperature is not reported, send as FFF. |
| Water Contact | X | No water present - 0 [0x00] Water present - 1 [0x01] |
| Battery Remaining (%) | XX | The amount of battery remaining represented as a percentage. If battery remaining is not reported, send as FF. |
| RF RSSI | XX | The received signal strength indicator of the base-sensor RF. The RSSI should be a value between 0 and −120. A negative value is assumed and therefore send an absolute value. For example, −80 db is sent as 0x50. |
| Timestamp | X[8] | The timestamp when the reading was captured from the sensor. Specified in number of seconds since the device was booted. The timestamp must always be less than the device timestamp sent on the request header record. |
| <End of Record> | \n | |
| Start Version Record | "V" | Start sentinel for a version record. This version record is optional but should be sent on device boot-up and periodically afterward. At most one record can be reported. |
| Record Version | "01" | Informs the server what structure of version record is being transmitted. |
| Hardware Version | AN.NN | The hardware revision. The first revision will report as "A1.00". The second revision will report as "A1.01" and so on. |
| Firmware Version | N.NNA | The version of the software loaded on the device. The first release of the software will be shown as "1.00" and the second release will likely show as "1.01". The alpha character trailing the version number represents if the version is experimental or stable. All stable versions (released to production) will be presented with a "Z". Any other letter may be used for experimental versions. |
| <End of Record> | \n | |

In another example, the server 300 may send a response to the base unit 200 in the following format shown in Table 3.

TABLE 3

| Description | Format | Remarks |
| --- | --- | --- |
| <Start Firmware Record> | "F" | This record is not sent if an update is not required. |
| Firmware Flag | X | Optional field - Instructions for updating the device firmware:<br>Update Available - [0x01]<br>Critical Update - [0x02] |
| <End of Record> | \n | |
| <Start Modify Sensor Record> | "S" | Zero or more "remove sensor" records may be returned. For every record returned, the device should unpair the referenced sensor. |
| Sensor ID | X[12] | The ID of the sensor to remove (unpair). |
| Modification Type | X | Remove sensor - 0 [0x00]<br>Add sensor - 1 [0x01] |
| <End Modify Sensor Record> | \n | |

In another example, the base unit 100 may report available Wi-Fi network to the server 300 in the following format shown in Table 4.

TABLE 4

| Description | Format | Remarks |
| --- | --- | --- |
| <Start Wifi Network Record> | "N" | |
| Security Mode | X | The network security setting:<br>Open - [0x00]<br>WPA - [0x01]<br>WPA2 - [0x02]<br>WEP - [0x03] |
| RSSI | XX | The received signal strength indicator. The RSSI should be a value between 0 and −120. A negative value is assumed and therefore send an absolute value. For example, −80 db is sent as 0x50. |
| <SSID Length> | XX | The length of the SSID field. |
| SSID | A? | The name of the Wi-Fi network Base64 encoded. |
| <End of Record> | \n | |

In another example, the server 300 may respond to the base unit 100 regarding the available Wi-Fi network in the following format shown in Table 5.

TABLE 5

| Description | Format | Remarks |
| --- | --- | --- |
| <Start of Record> | "C" | |
| <SSID Length> | XX | The length of the SSID field. |
| SSID | A? | The name of the Wi-Fi network Base64 encoded. |
| <Key Length> | XX | The length of the network key/password field. |
| Key/Password | A? | The Wi-Fi network key/password Base64 encoded. |
| Static Network Flag | X | Instructions for setting up the network:<br>Static IP - [0x01]<br>Static DNS - [0x02] |
| IP Address | A[15] | The IP address to use, pad right with spaces. If IP is not static, fill with spaces. |
| Subnet Mask | A[15] | The subnet mask to use, pad right with spaces. If IP is not static, fill with spaces. |
| Gateway | A[15] | The gateway IP address to use, pad right with spaces. If IP is not static, fill with spaces. |

TABLE 5-continued

| Description | Format | Remarks |
| --- | --- | --- |
| DNS 1 | A[15] | The first DNS server to use, pad right with spaces. If DNS is not static, fill with spaces. |
| DNS 2 | A[15] | The second DNS server to use, pad right with spaces. If IP is not static, fill with spaces. |
| <End of Record> | \n | |

In another example, the server 300 may instruct the base unit 100 to rescan Wi-Fi networks in the following format shown in Table 6.

TABLE 6

| Description | Format | Remarks |
| --- | --- | --- |
| <Start of Record> | "W" | |
| <End of Record> | \n | |

In another example, the server 300 may instruct the base unit 100 to cancel a Wi-Fi networks in the following format shown in Table 7.

TABLE 7

| Description | Format | Remarks |
| --- | --- | --- |
| <Start of Record> | "X" | |
| <End of Record> | \n | |

In another example, the base unit 100 may send a request to the server 300 for registering a sensor unit 200 in the server 300 in the following format shown in Table 8.

TABLE 8

| Description | Format | Remarks |
| --- | --- | --- |
| <Start Sensor Network Record> | "S" | |
| Sensor ID | X[12] | The ID of the sensor being reported (this is the MAC address of the sensor). The ID should be left padded with zeroes if it does not consume the allocated space. |
| <End of Record> | \n | |

In another example, the server 300 may respond to the request for registering a sensor unit 200 in the server 300 in the following format shown in Table 9.

TABLE 9

| Description | Format | Remarks |
| --- | --- | --- |
| <Start of Record> | "P" | |
| Sensor ID | X[12] | The ID of the sensor being reported (this is the MAC address of the sensor). The ID should be left padded with zeroes if it does not consume the allocated space. |
| Pairing Result | X | 0x00 - Pairing failed<br>0x01 - Pairing successful<br>0x02 - Sensor already paired (successful) |
| <End of Record> | \n | |

Through the descriptions of the example embodiments, the example embodiments may be implemented by using hardware only or by using software and a necessary universal hardware platform. Based on such understandings, the technical solution of some example embodiments may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the example embodiments. For example, such an execution may correspond to a simulation of the logical operations as described herein. The software product may additionally or alternatively include number of instructions that enable a computer device to execute operations for configuring or programming a digital logic apparatus in accordance with example embodiments.

Example apparatuses and methods described herein, in accordance with example embodiments, can be implemented by one or more controllers. The controllers can comprise hardware, software, or a combination of hardware and software, depending on the particular application, component or function. In some example embodiments, the one or more controllers can include analog or digital components, and can include one or more processors, one or more non-transitory storage mediums such as memory storing instructions executable by the one or more processors, one or more transceivers (or separate transmitters and receivers), one or more signal processors (analog and/or digital), and/or one or more analog circuit components.

In the described methods or block diagrams, the boxes may represent events, steps, functions, processes, modules, messages, and/or state-based operations, etc. Although some of the above examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

The above discussed embodiments are considered to be illustrative and not restrictive. Example embodiments described as methods would similarly apply to systems, and vice-versa.

Variations may be made to some example embodiments, which may include combinations and sub-combinations of any of the above. The example embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

The specification and drawings are, accordingly, to be regarded simply as an illustration, and are contemplated to cover any and all modifications, variations, combinations or equivalents. Certain adaptations and modifications of the described embodiments can be made. Therefore, the above discussed embodiments are considered to be illustrative and not restrictive.

The invention claimed is:

1. A method of monitoring one or more environmental variables of a premises, comprising:
   detecting, from a base unit, at least one sensor unit as being in proximity of the base unit using a short range communication protocol by being tapped to the base unit, each at least one sensor unit including at least one environmental sensor module for detecting at least one of the environmental variables, wherein the base unit comprises at least one environmental sensor module for detecting at least one of temperature, humidity, and/or presence of liquid of the premises;
   obtaining an identifier of the at least one the sensor unit, from that sensor unit, using the short range communication protocol;
   registering, in a memory of the base unit, the at least one sensor unit using the identifier of that sensor unit obtained by the base unit from the short range communication protocol;
   receiving, by the base unit from the at least one sensor unit, data related to at least one of the environmental variables detected by that sensor unit;
   determining which one of a Wireless Wide Area Network (WWAN) versus a Wireless Fidelity (Wi-Fi) network is available; and
   receiving, by the base unit, a text message via short message service (SMS) from a server;
   in response to receiving the text message: transmitting over the Wireless Wide Area Network (WWAN) or the Wireless Fidelity (Wi-Fi) network that is determined to be available, by the base unit, to the server the data received from the at least one sensor unit and data of the at least one environmental sensor module of the base unit.

2. The method of claim 1, wherein the identifier is a radiofrequency identity (RF ID) of the at least one sensor, and wherein the base unit has an RF ID reader for reading the identifier.

3. The method of claim 2, wherein the method further includes, in response to the tapping, receiving in the RF ID reader of the base unit the RF ID from the sensor unit.

4. The method of claim 1, further comprising:
   the base unit registering with the server by transmitting to the server a base unit identifier that is uniquely associated with the base unit; and
   the base unit registering with the server at least one of the sensor units that are registered with the base unit by transmitting to the server the identifier of that sensor unit.

5. The method of claim 4, further comprising processing, at the server or at the base unit, data related to at least one of the environmental variables detected by at least one of the sensor units, determining an alert event from said processing, and in response to said determining, sending a notification from the server to a user equipment.

6. The method of claim 5, wherein the notification is sent to the user equipment by a text message, an email, or a push notification.

7. The method of claim 4, wherein the transmitting the data from the base unit to the server performed over the WWAN bypasses the Wi-Fi network.

8. The method of claim 1, further comprising, in response to the detecting of at least one of the sensor units as being in the proximity of the base unit, generating, at the base unit, a visual output and/or an audio output.

9. The method of claim 1, wherein at least one of the environment variables detected by at least one of the sensor units includes temperature, humidity, and/or liquid of the premises.

10. The method of claim 1, wherein the short range communication protocol is a RF ID protocol or a near field communication (NFC) protocol.

11. The method of claim 1, further comprising:
detecting, by the base unit, a power outage through detection of outlet power; and in response:
activating, by the base unit, a battery backup unit for supplying power to the base unit.

12. The method of claim 1, wherein said receiving by the base unit of the data from at least one of the sensor units relating to at least one of the environmental variables is received via a wireless communication channel using an unlicensed frequency spectrum.

13. The method of claim 1, wherein said receiving by the base unit of the data from at least one of the sensor units relating to at least one of the environmental variables is received via a wireless communication modality that bypasses the short range communication protocol and bypasses the Wi-Fi network.

14. The method of claim 1, further comprising:
making, by the base unit, a Hypertext Transfer Protocol (HTTP) request over Secure Sockets Layer (SSL) and opening a TCP socket over the SSL; and
accessing, by the base unit, a RESTful API using a TCP/IP protocol to communicate with the server.

15. The method of claim 1, wherein registering the at least one sensor unit with the base unit comprises automatically registering with the base unit in response to the tapping.

16. The method of claim 1, wherein based on the sensed data from the sensor unit, the base unit is configured to turn on or turn off a power outlet to a pump.

17. The method of claim 1, wherein the base unit communicates with the server using web sockets, long polling sockets, or a message queuing telemetry transport (MQTT).

18. A system for monitoring one or more environmental variables of a premises, comprising:
at least one sensor unit including at least one environmental sensor module for detecting at least one of the environmental variables; and
a base unit comprising at least one environmental sensor module for detecting temperature, humidity, and/or presence of liquid of the premises, the base unit configured to:
detect the at least one sensor unit as being in proximity of the base unit using a short range communication protocol by the at least one sensor unit being tapped to the base unit,
obtains an identifier of the at least one sensor unit, from that sensor unit, using the short range communication protocol,
register, in memory of the base unit, the at least one sensor unit using the identifier of that sensor unit obtained by the base unit from the short range communication protocol,
receive, from the at least one sensor unit, data related to at least one of the environmental variables detected by that sensor unit,
determine which one of a Wireless Wide Area Network (WWAN) versus a Wireless Fidelity (Wi-Fi) network is available,
receive a text message via short message service (SMS) from a server, and
in response to receiving the text message, transmit to the server, over the Wireless Wide Area Network (WWAN) or the Wireless Fidelity (Wi-Fi) network that is determined to be available, the data received from the at least one sensor unit and data of the at least one environmental sensor module of the base unit.

19. The system of claim 18, further comprising the server, wherein the base unit is configured to register the base unit with the server by transmitting to the server a base unit identifier that is uniquely associated with the base unit, and to register at least one of the sensor units with the server in association with the base unit, by the identifier of that sensor unit, and to send, to the server, data related to at least one environmental variables detected by the base unit.

* * * * *